United States Patent [19]

Kim

[11] Patent Number: 5,765,646

[45] Date of Patent: Jun. 16, 1998

[54] COMBINED CONTROL MACHINE FOR AN ORCHARD

[75] Inventor: Woong Gil Kim, Taegu, Rep. of Korea

[73] Assignee: A. I. C. Machinery Co. Ltd., Taegu, Rep. of Korea

[21] Appl. No.: 594,094

[22] Filed: Jan. 31, 1996

[30] Foreign Application Priority Data

| Mar. 24, 1995 | [KR] | Rep. of Korea | 1995-5642 |
| Mar. 24, 1995 | [KR] | Rep. of Korea | 1995-5643 |
| May 15, 1995 | [KR] | Rep. of Korea | 1995-10643 |
| May 15, 1995 | [KR] | Rep. of Korea | 1995-10647 |
| Jun. 13, 1995 | [KR] | Rep. of Korea | 1995-16122 |

[51] Int. Cl.$^6$ ............................................. A01D 46/00
[52] U.S. Cl. .................... 172/35; 172/247; 172/253; 56/328.1; 56/DIG. 14; 56/DIG. 9; 56/DIG. 6; 74/15.2; 74/15.4
[58] Field of Search ................................ 172/35, 245, 246, 172/247, 253, 254; 56/328.1, 329, 15.1, 15.2, DIG. 14, DIG. 6, DIG. 9, 340.1; 74/15.2, 15.4

[56] References Cited

U.S. PATENT DOCUMENTS

| 3,457,712 | 7/1969 | Gould et al. | 56/340.1 |
| 3,762,140 | 10/1973 | Block | 56/328.1 |
| 3,961,469 | 6/1976 | McRobert | 56/328.1 |
| 4,015,366 | 4/1977 | Hall, III | 56/328.1 X |
| 4,827,705 | 5/1989 | Souda et al. | 56/328.1 |
| 4,938,085 | 7/1990 | Suzuki et al. | 74/15.2 |
| 5,046,994 | 9/1991 | Hasegawa et al. | 74/15.2 X |
| 5,319,911 | 6/1994 | Wilhite | 56/328.1 |
| 5,478,192 | 12/1995 | Bentivoglio . | |
| 5,893,286 | 7/1975 | Buttram et al. | 56/340.1 X |

FOREIGN PATENT DOCUMENTS

| 511495 | 6/1952 | Belgium | 172/246 |
| 1169181 | 4/1964 | Germany | 172/245 |
| 1148073 | 4/1969 | United Kingdom | 172/246 |

*Primary Examiner*—Terry Lee Melius
*Assistant Examiner*—Christopher J. Novosad
*Attorney, Agent, or Firm*—Morrison Law Firm

[57] ABSTRACT

Various types of working machines can be installed on a combined control machine car body as occasion demands, and the operation of a working machine can be automatically performed with the engine power of said combined control machine car body without a separate power source for each working machine. Accordingly, various types of fruit culture tasks can be simultaneously performed, thereby reducing expenditures, and more productively and efficiently performing the tasks of preventing damage by disease and pest, rotary work, cultivation weeding, spreading earth, pruning and sprinkling compost.

34 Claims, 41 Drawing Sheets

COMBINED CONTROL MACHINE FOR AN ORCHARD

BACKGROUND OF THE INVENTION

The present invention relates to a combined control machine for performing tasks on an orchard. In general, various types of orchard tasks require a lot of labor power such as preventing damage by disease pest, plowing, spreading earth, rotary work, pruning, sprinkling compost, crushing twigs, weeding, rice straw cut-sprinkling, and transporting. These jobs are compositively performed for fruit culture work in the orchard. Due to manpower problems and labor costs, if the above works are not mechanized, fruit culture is impossible. Therefore, a number of specific working machines are required to run an orchard and perform the required tasks.

However, in this fruit culture management, expenses pile up due to the purchase of all the required specific working machines. To perform the orchard tasks, many different types of working machines are used, and so, a decline of working efficiency and an increase of management expenses are incurred. Accordingly an increase of income of the fruit farm house is hindered, and in order to improve this, a designed combined control machine, so as to use several kinds of working machines in contrived. However, in this case, a separate power source is used for each working machine. Expenses are still high for this working machine because each power source must be maintained and a worker is put to inconvenience to control each working machine which is working at anytime. Therefore, the working efficiency of an orchard is not increased.

OBJECTS AND SUMMARY OF THE INVENTION

It is an object of the present invention to provide one machine capable of performing various tasks required for an orchard.

It is another object of the present invention to provide a machine that can perform various tasks required for an orchard using one power source.

It is yet another object of the present invention to provide a machine for an orchard for performing various tasks required for an orchard which is controlled by one operator.

Briefly, various types of working machines can be installed on a combined control machine car body as occasion demands, and the operation of a working machine can be automatically performed with the engine power of said combined control machine car body without a separate power source for each working machine. Accordingly, various types of fruit culture tasks can be simultaneously performed, thereby reducing expenditures, and more productively and efficiently performing the tasks of preventing damage by disease and pest, rotary work, cultivation weeding, spreading earth, pruning, and sprinkling compost.

Various types of working machines are selectively set up at a combined control machines car body, and all tasks necessary to in orchard like prevention for damage by disease and pest, compost spreading, organic fertilizer spreading, sprinkling lime, weeding, cultivation weeding, plowing, spreading earth, crushing twigs, transporting, rice straw cut sprinkling, and pruning work, can be mechanized, and at the same time, the installation-detachment of a working machine is simple and easy, therefore the combined control machine for the orchard is convenient for use.

Accordingly, in the present invention, various kinds of the working machines can be installed at a combined control machine car body as occasion demands. Each working machine is not equipped with a separate power source, but an operation of the working machine is automatically attained by making use of an engine power of the combined control machine car body. Therefore various types of orchard tasks (prevention of damage by disease and pest, compost sprinkling, weeding, plowing, spreading earth, cultivation weeding, transporting, earthing, crushing twig) can be performed. As a result, a curtailment of expenditure and high efficiency in fruit culture are created.

According to an embodiment of the present invention, there is provided, a combined control machine for an orchard comprising: a chassis, a driving device including an engine mounted on said chassis, a transmission mounted on said chassis, a gear box mounted at a rear of said chassis, said transmission including means for moving said combined control machine, installation means, located at a front and said rear of said chassis, for coupling various types of working machine attachments to said combined control machine, means for raising and lowering a platform mounted in a center of said chassis, hydraulic means for providing hydraulic power to various types of working machine attachments coupled to said front and rear of said combined control machine, said engine including means for providing power to said transmission, said gear box, said means for raising and lowering, said hydraulic means, and said various types of working machines coupled to said front and said rear of said combined control machine, and said gear box including means for providing power to said various types of working machines coupled to said rear of said combined control machine.

In another embodiment of the present invention, there is provided, a combined control machine for an orchard, comprising: a chassis halving a front end and a rear end, a conventional motor, means for transporting said combined control machine, various machine attachments effective to perform various tasks required for an orchard, means for mounting said various machine attachments on said combined control machine; and said conventional motor including means for providing power to said means for transporting and means for providing power to said various machine attachments mounted on said combined control machine.

BRIEF DESCRIPTION OF THE INVENTION

Figure 4:
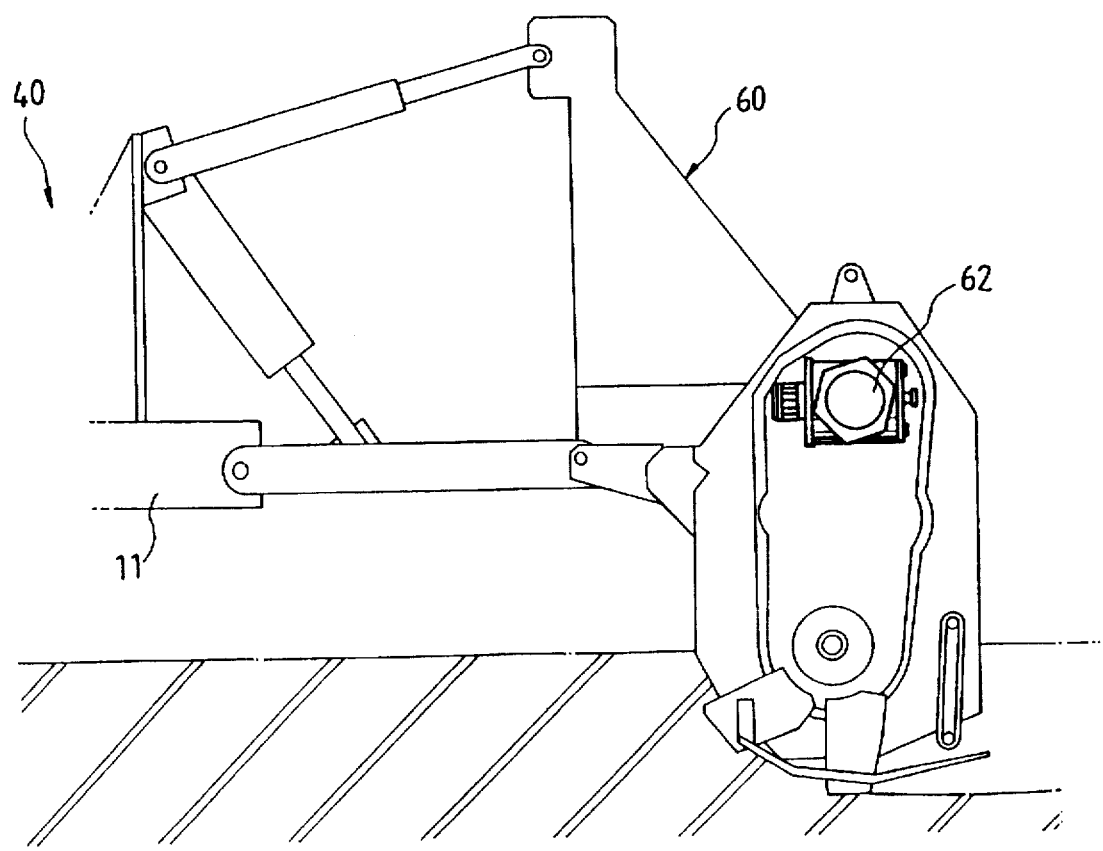

FIG. 4. is a summary view showing the instituted state of a working machine set up a hydraulic motor to the installation means of the present invention.

Figure 5:
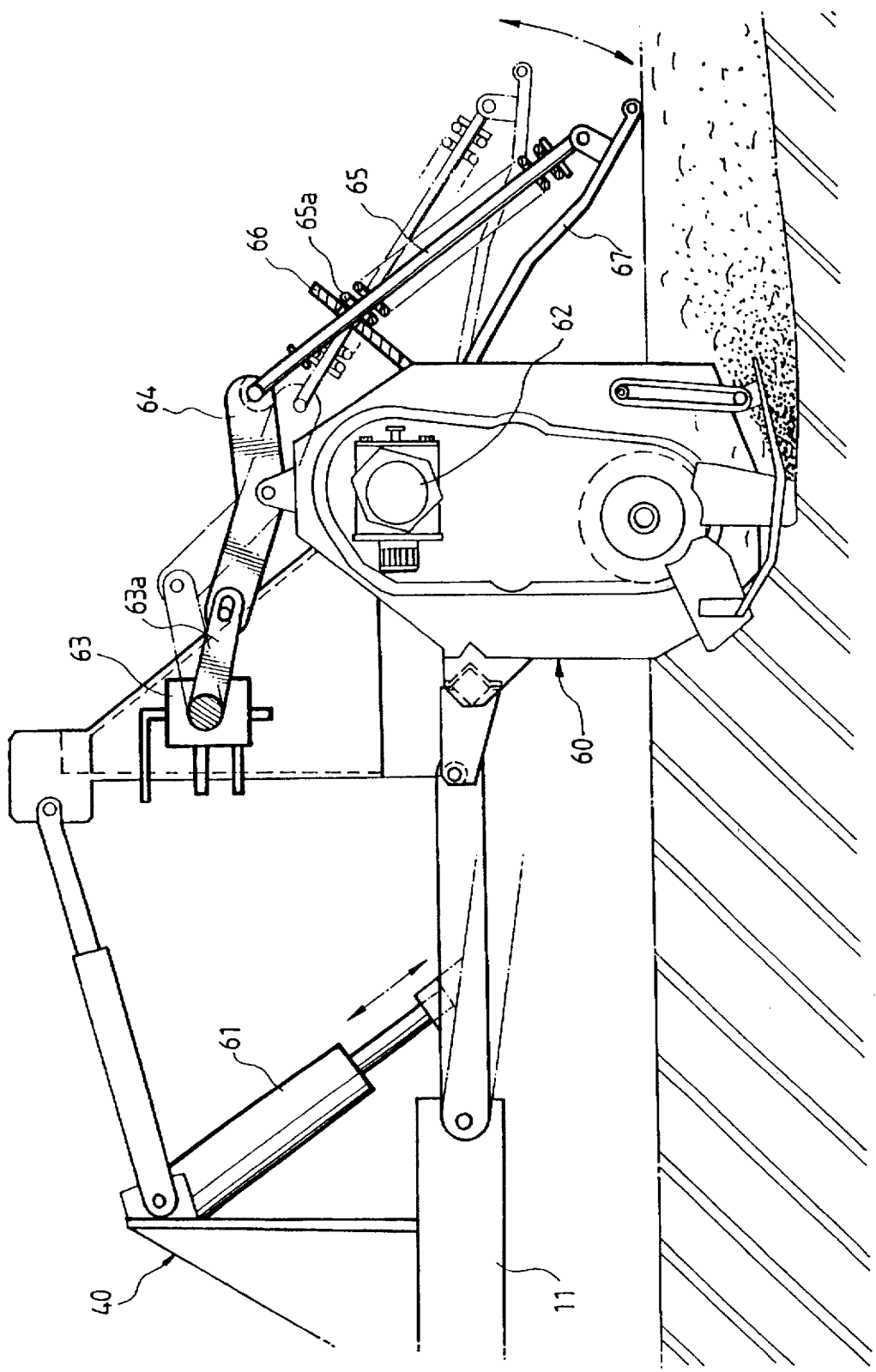

FIG. 5 is a working state view showing the working machine for performing the digging work of a fixed depth regardless of the bend of topography against the installation means of the present invention.

Figure 6:
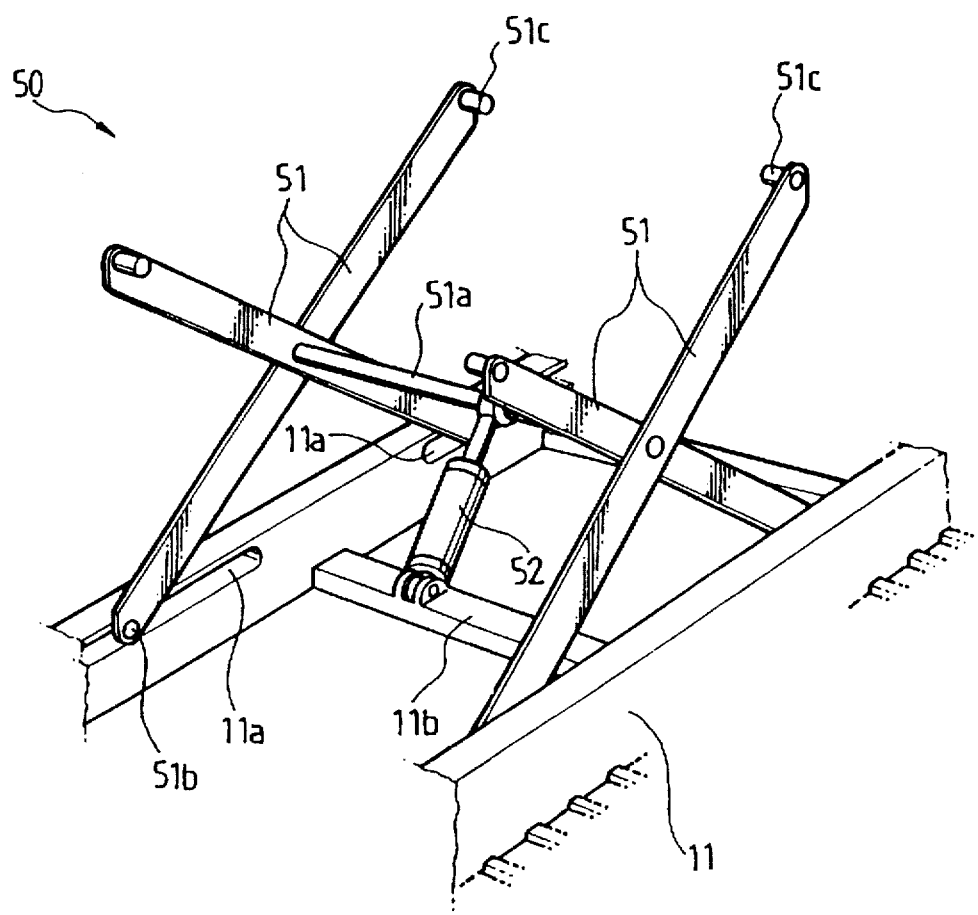

FIG. 6 is a perspective view showing means for ascending, descending, and lifting of the present invention.

Figure 7A:
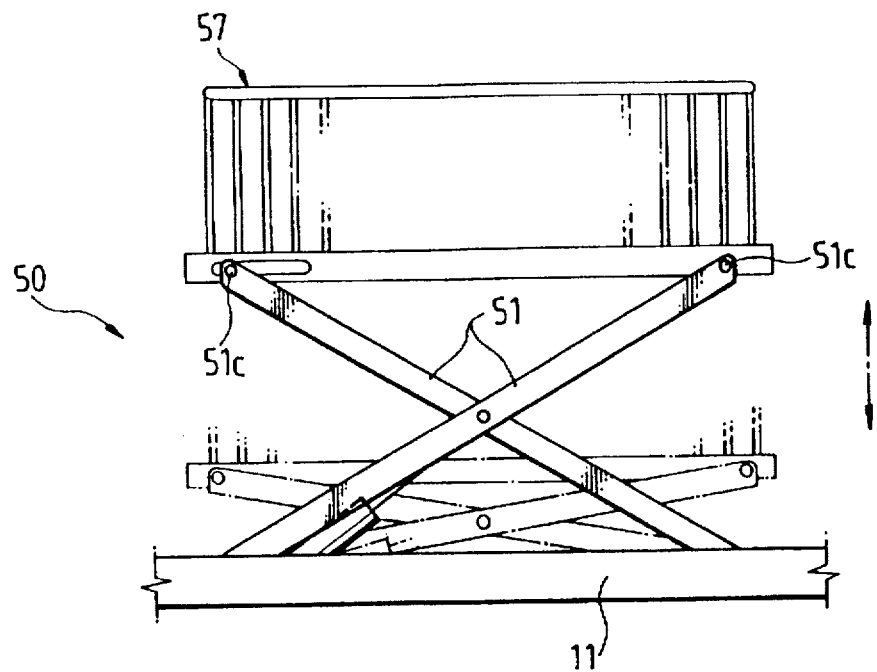

FIG. 7(A) is a plan view of the means for ascending, descending, and lifting of the present invention.

Figure 7B:
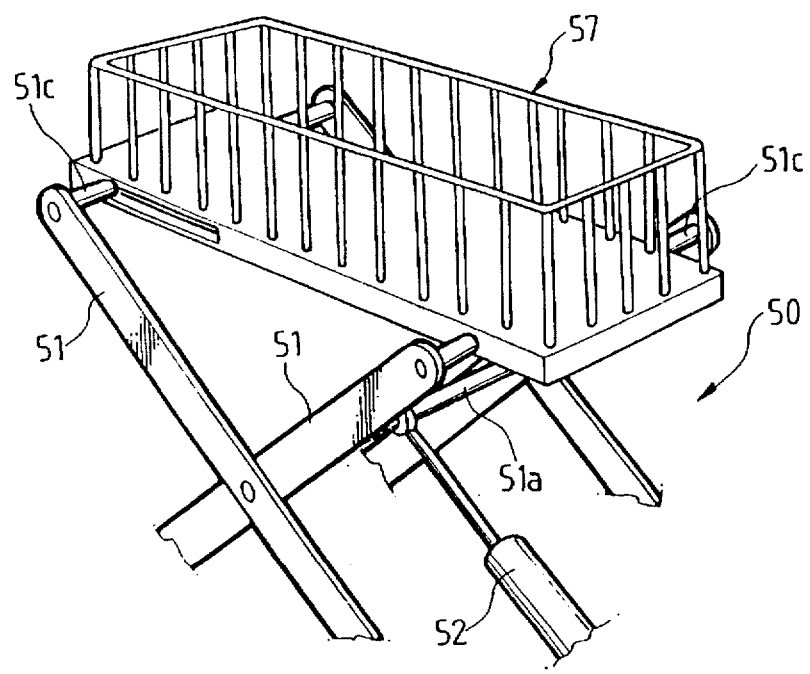

FIG. 7(B) is a perspective working state view of the means for lifting of the present invention.

Figure 8:
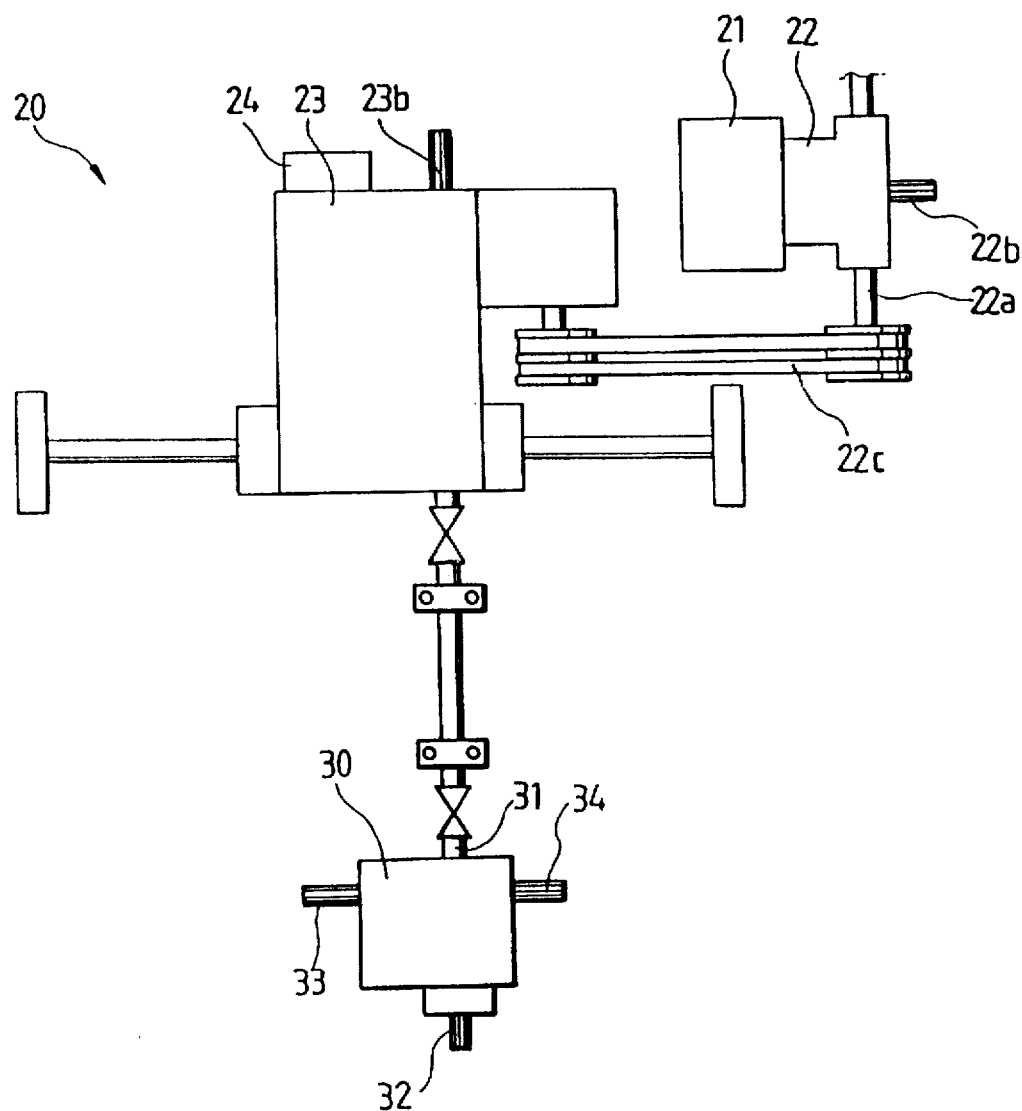

FIG. 8 is a summary view showing the power transmission relation of a driving device of the other illustration of the present invention.

Figure 9:
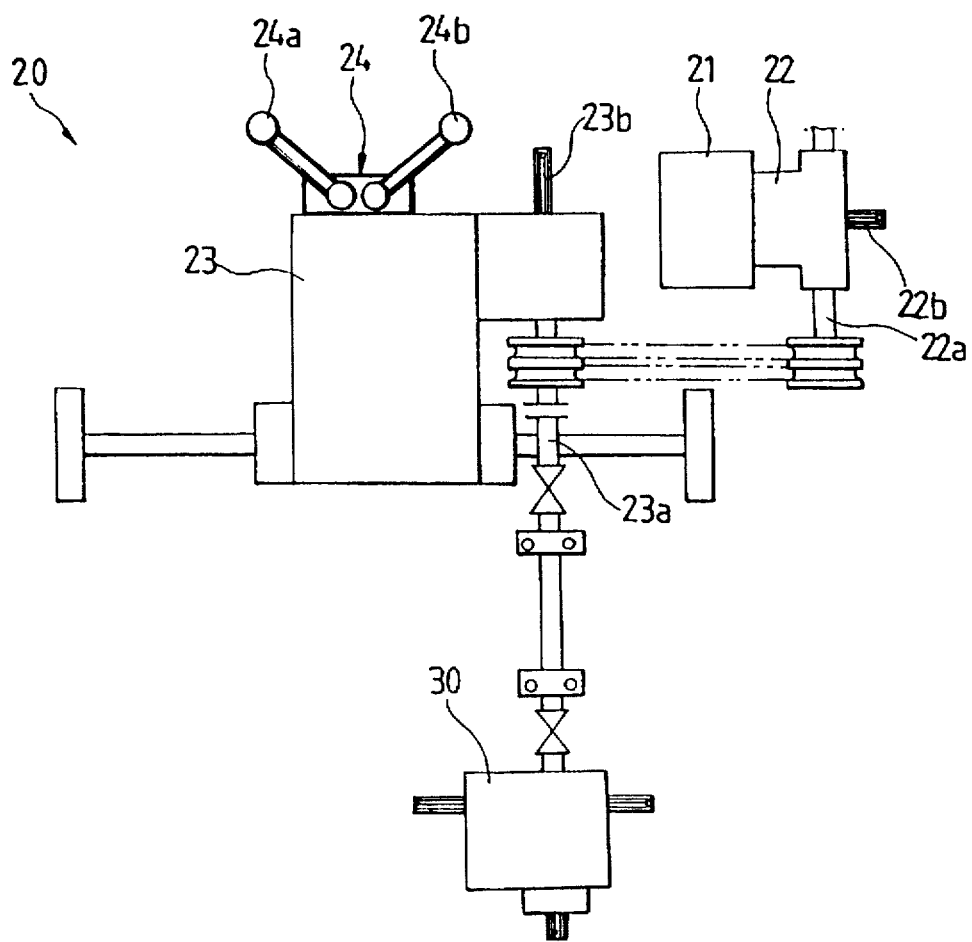

FIG. 9 is a summary view showing the means for speed change of the driving device of another embodiment of the present invention.

Figure 10:
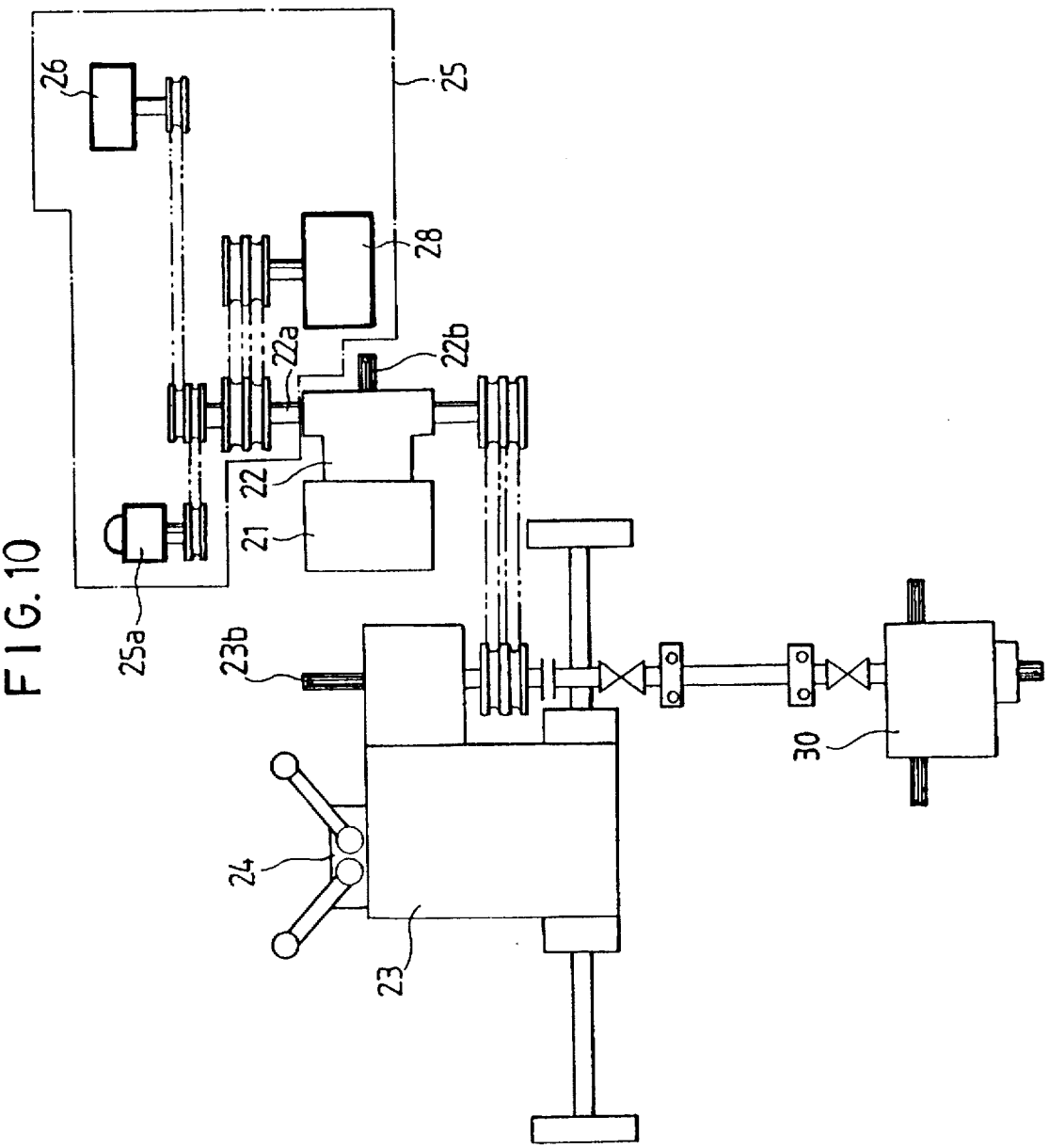

FIG. 10 is a summary view showing the state which the hydraulic pump and the air compressor are set up in the driving device of another of the present invention.

Figure 11A:
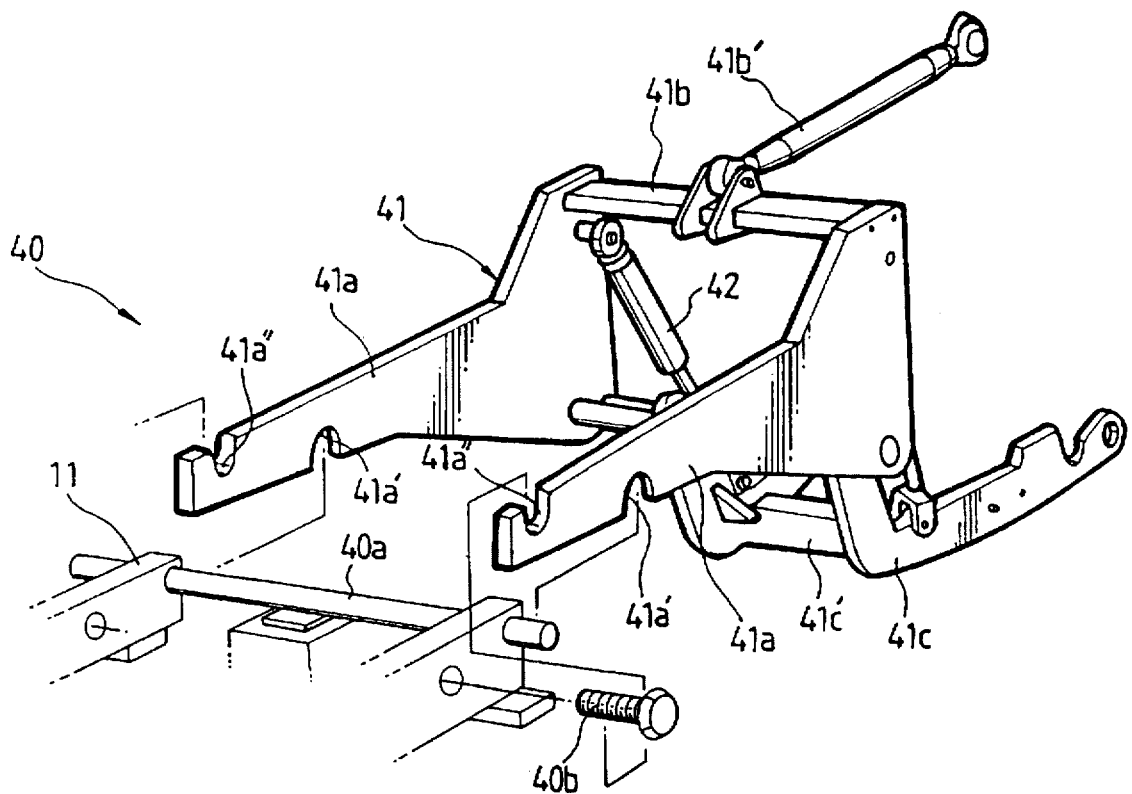

FIG. 11(A) is a perspective view showing a coupling device of the installation means of the present invention.

Figure 11B:
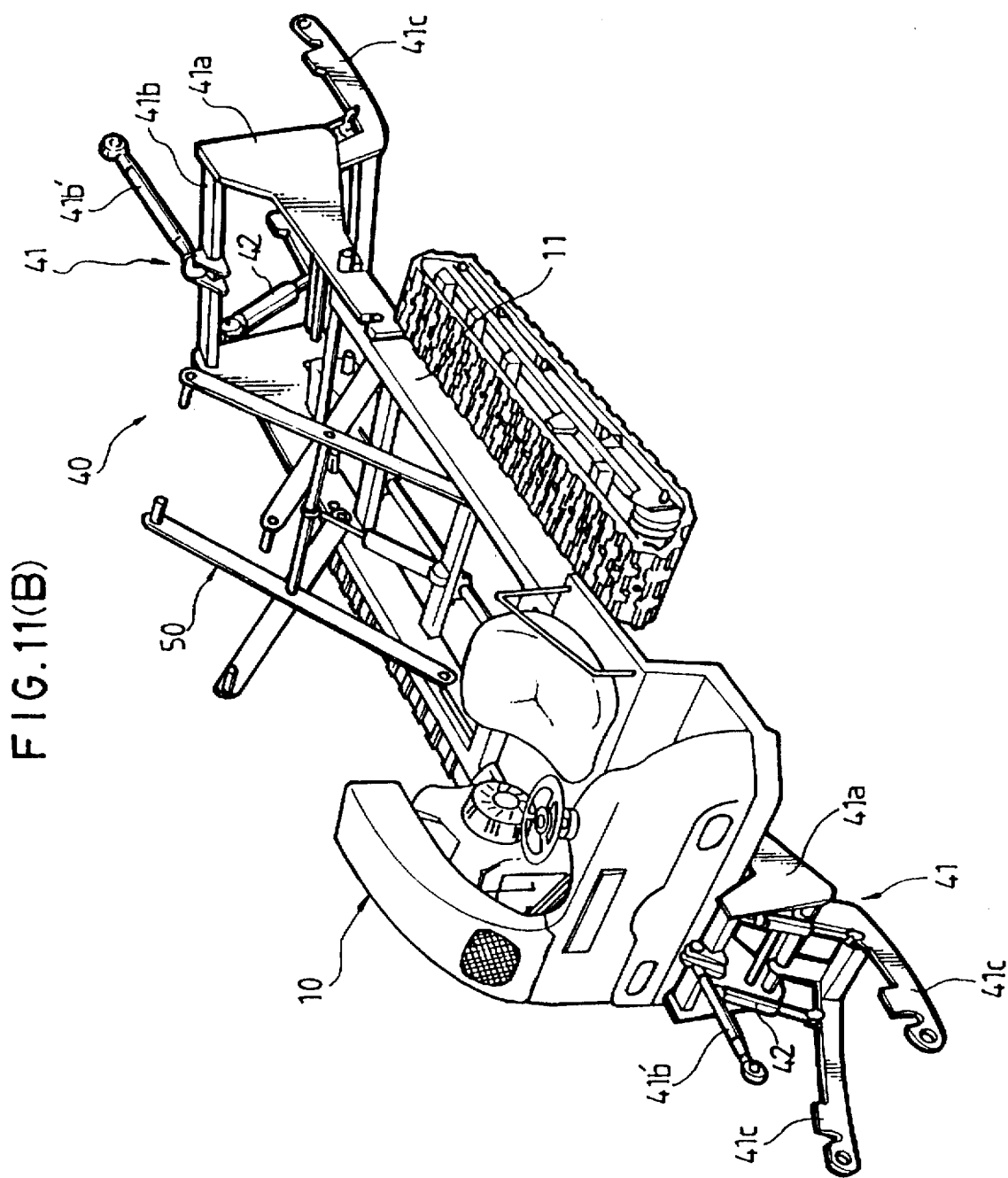

FIG. 11(B) is an instituted state view showing a coupling device of the installation means of the present invention.

Figure 12:
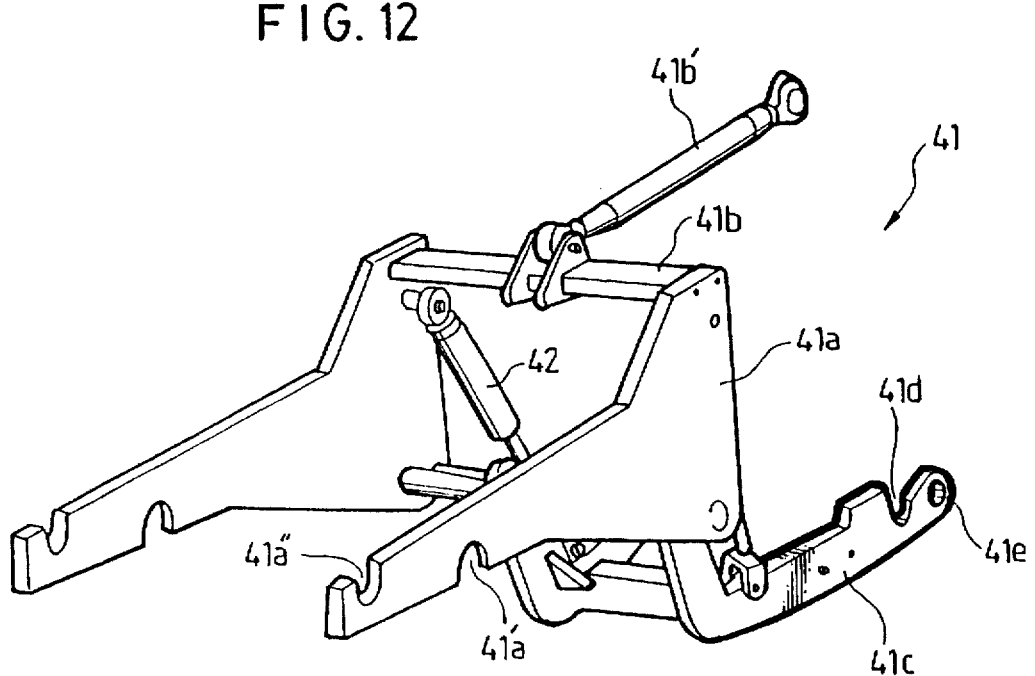

FIG. 12 is a perspective view showing the state which an installing groove and a fixed hole are formed at the coupling device of the installation means of the present invention.

Figure 13A:
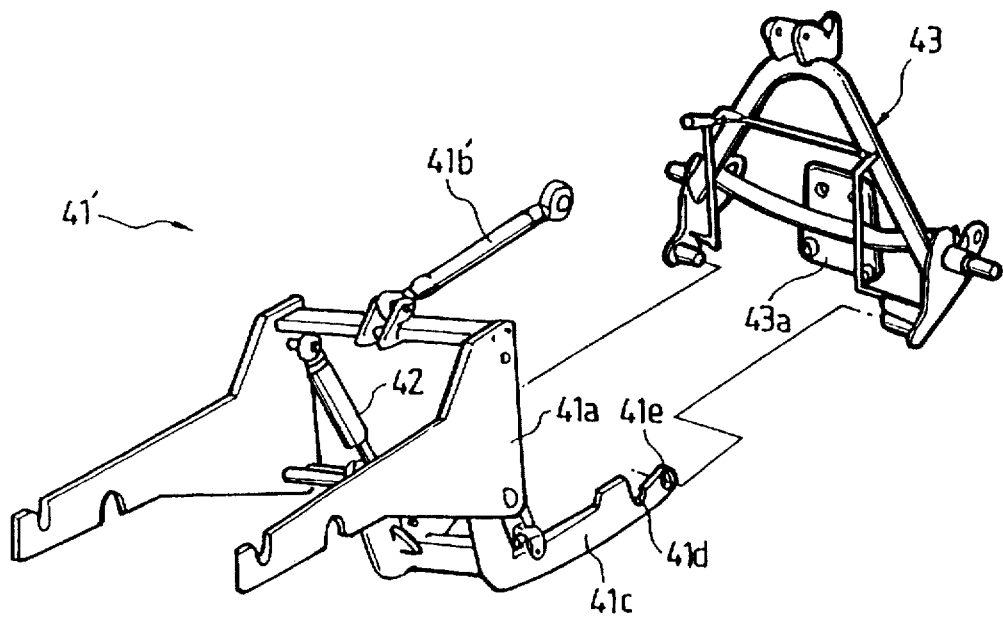

FIG. 13(A) is a perspective view showing the state which an attachment equipment is mounted on a coupling device of the installation means of the present invention.

Figure 13B:
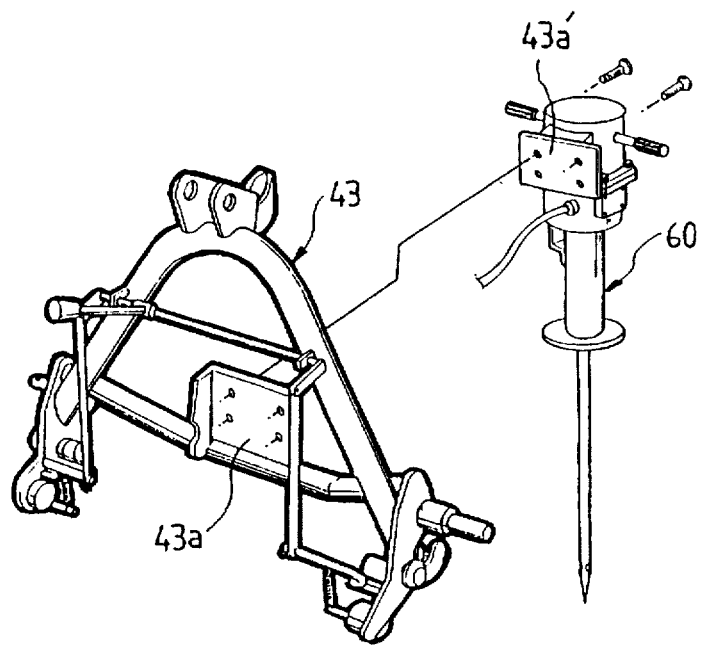

FIG. 13(B) is a state view showing the state which an attachment equipment is set up at the coupling device of the installation means of the present invention.

Figure 14:
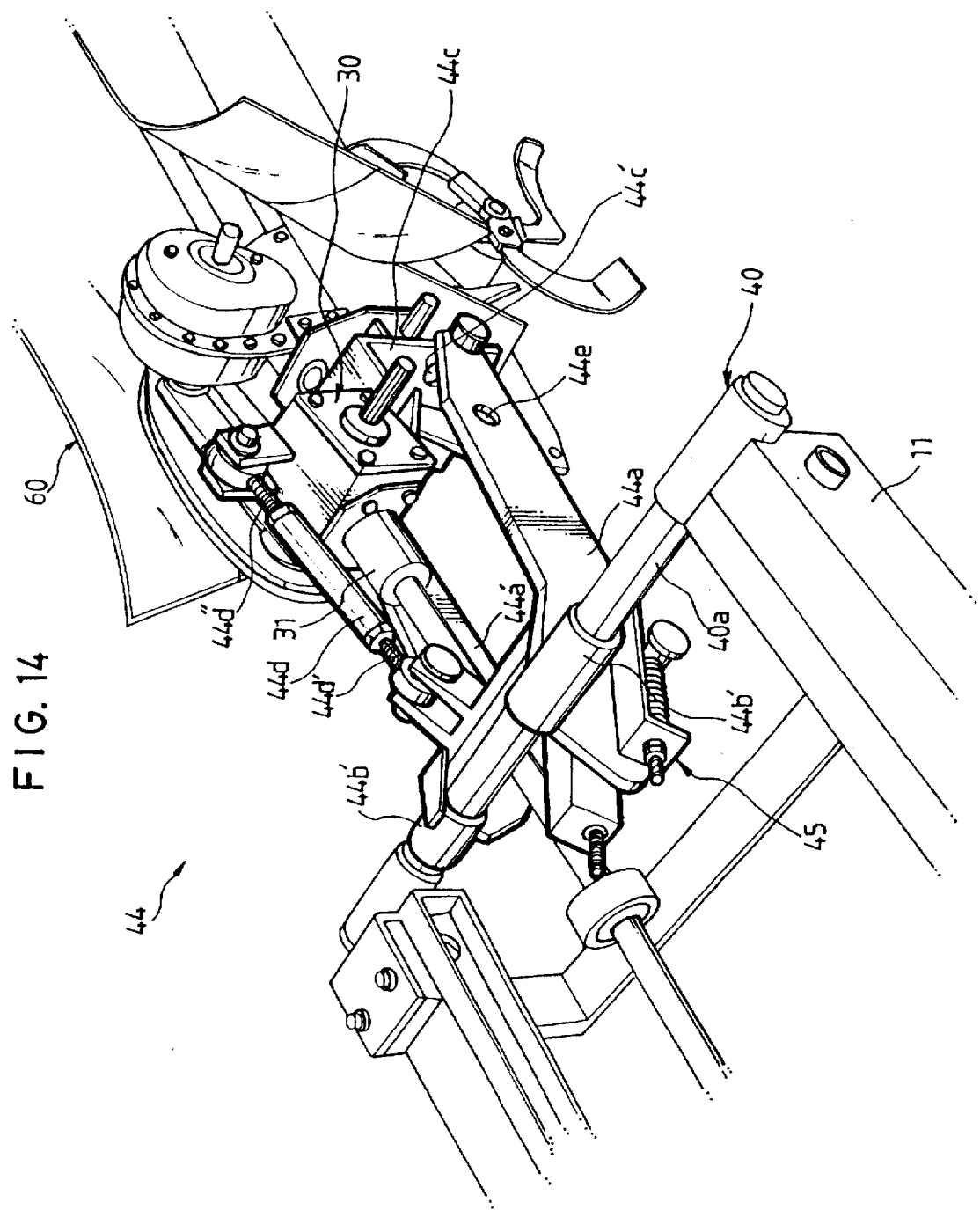

FIG. 14 is a perspective view showing the state which another coupling device of the installation means of the present invention.

Figure 15:
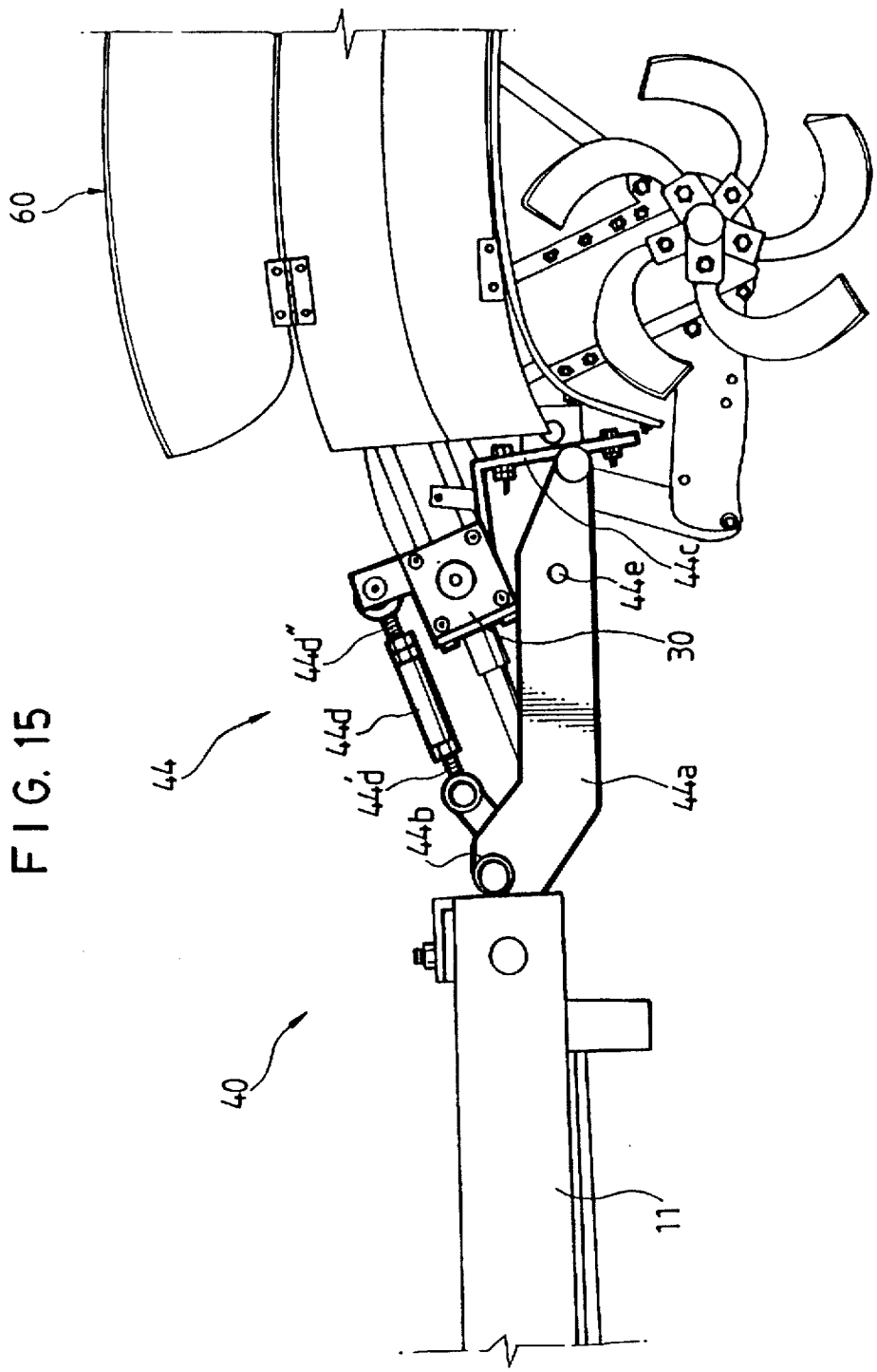

FIG. 15 is a side view showing the state which another coupling device of the installation means of the present invention.

Figure 16:
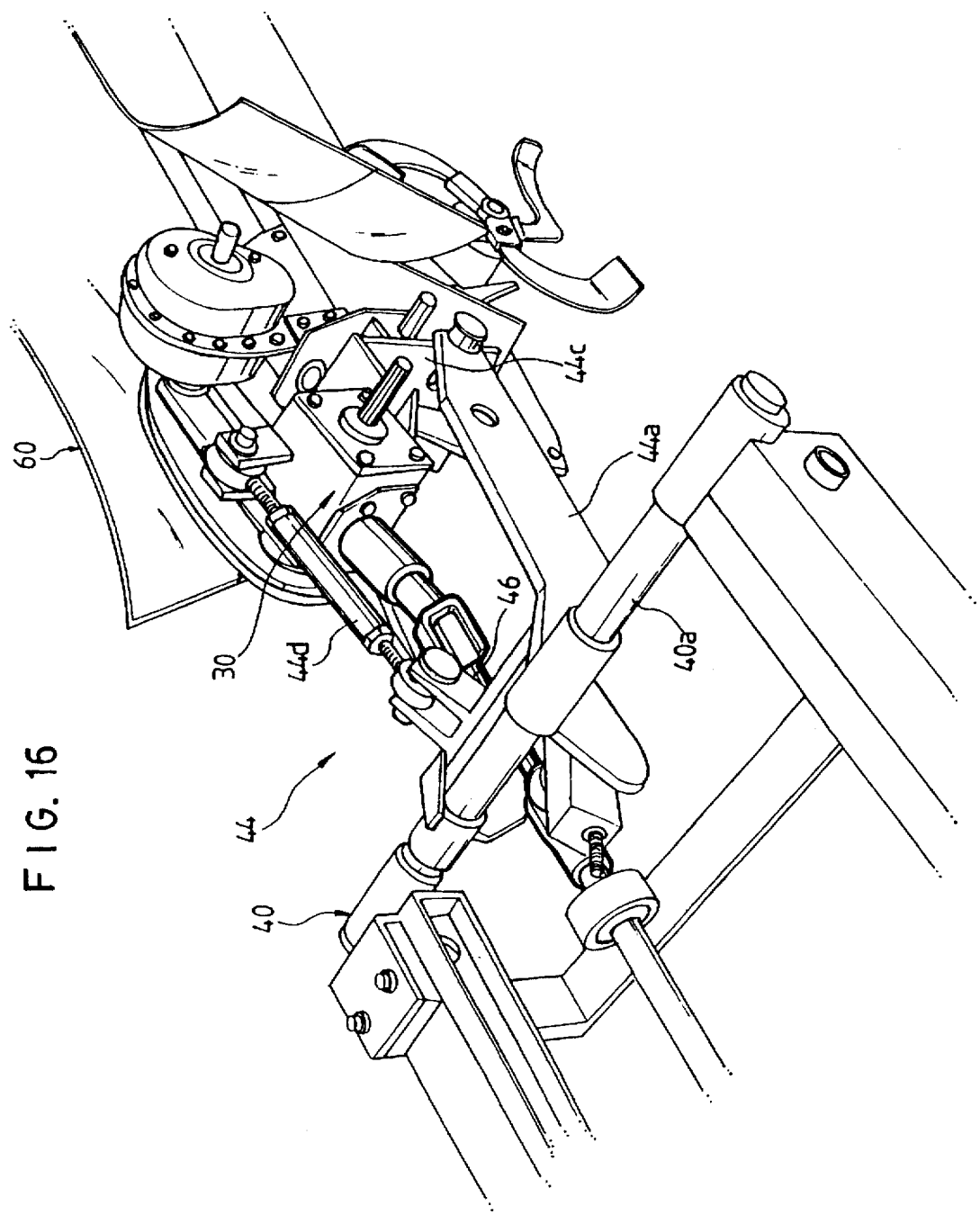

FIG. 16 is a perspective view showing the state which a power transmission axis is connected at another coupling device of the installation means of the present invention.

Figure 17:
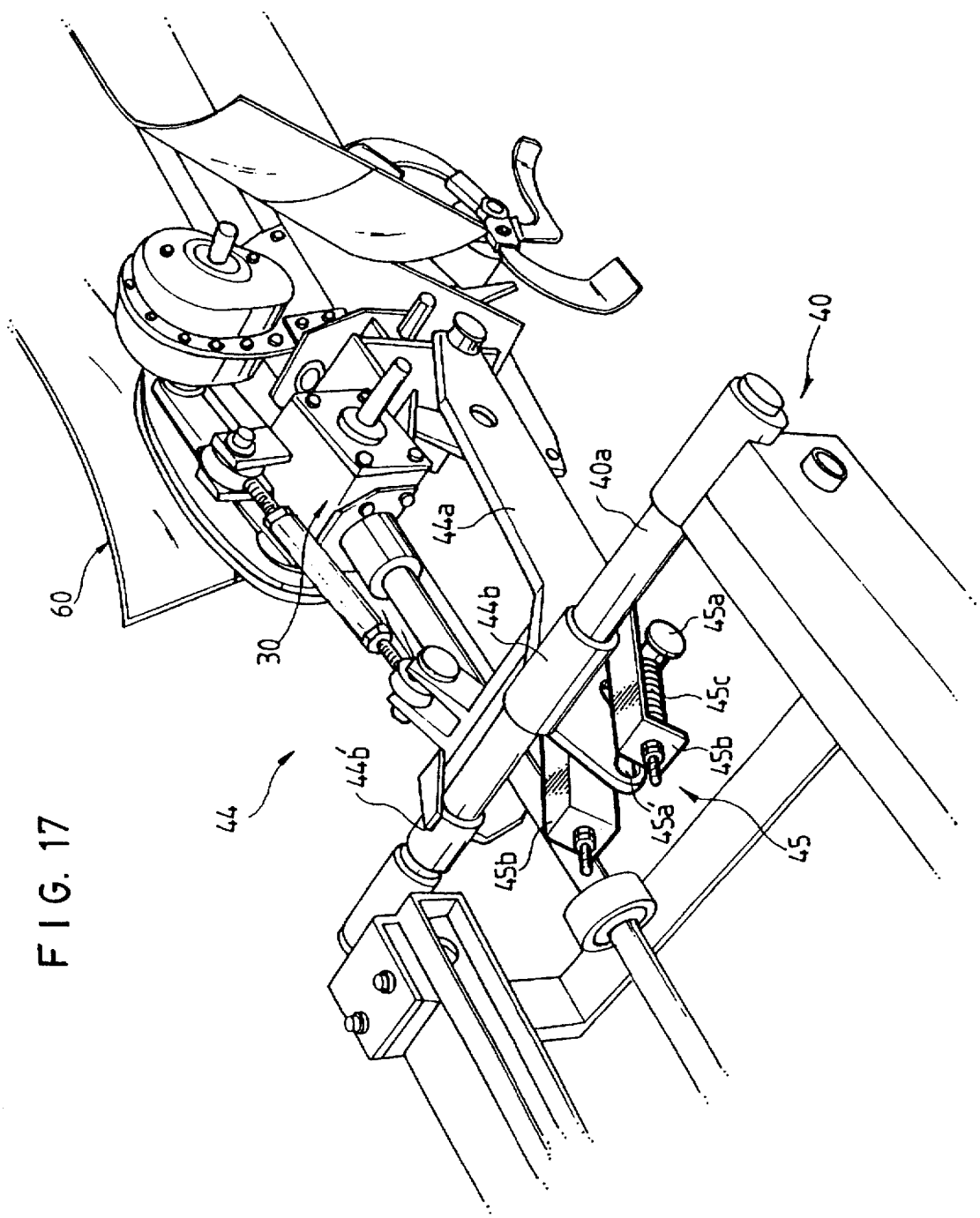

FIG. 17 is a perspective view showing the institution state of an elastic supporting tool set up at another coupling device of the installation means of the present invention.

Figure 18:
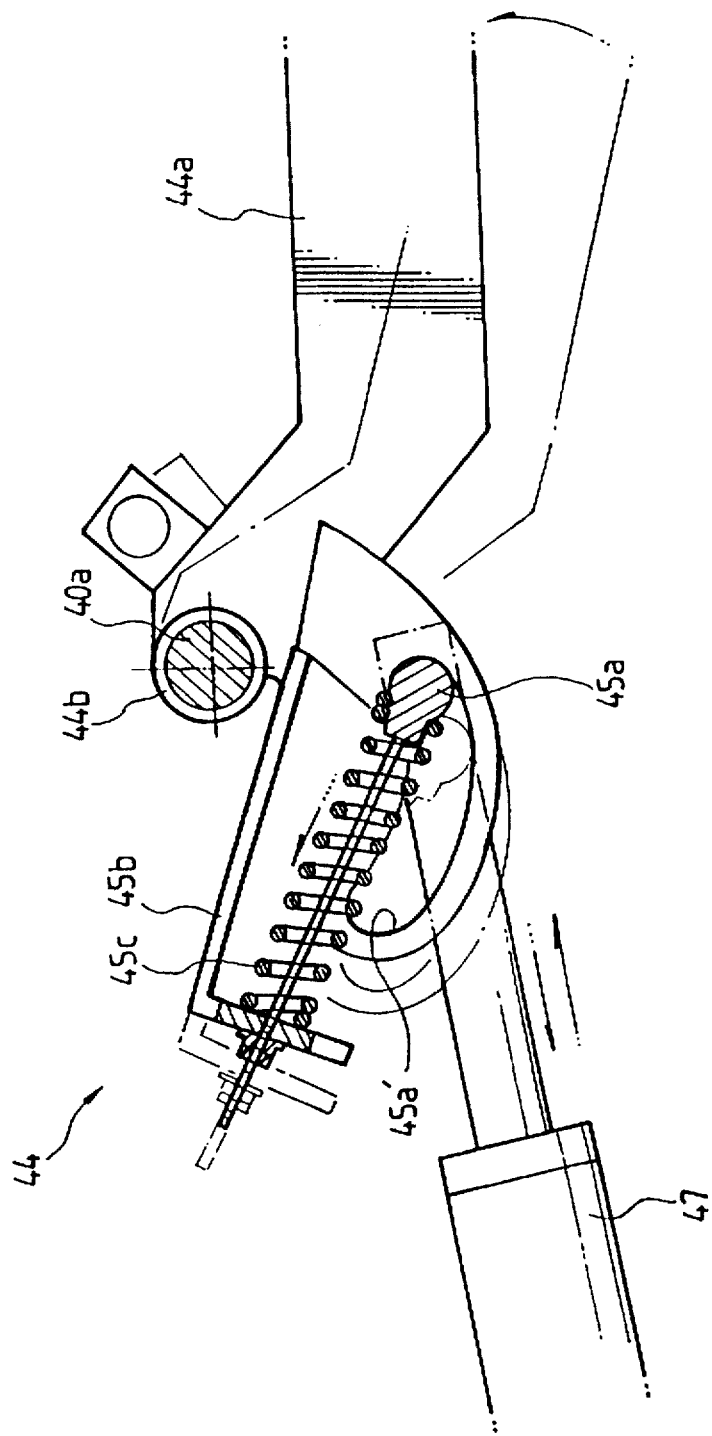

FIG. 18 is a main working state view showing the institution state of an elastic supporting tool set up at another coupling device of the installation means of the present invention.

Figure 19:
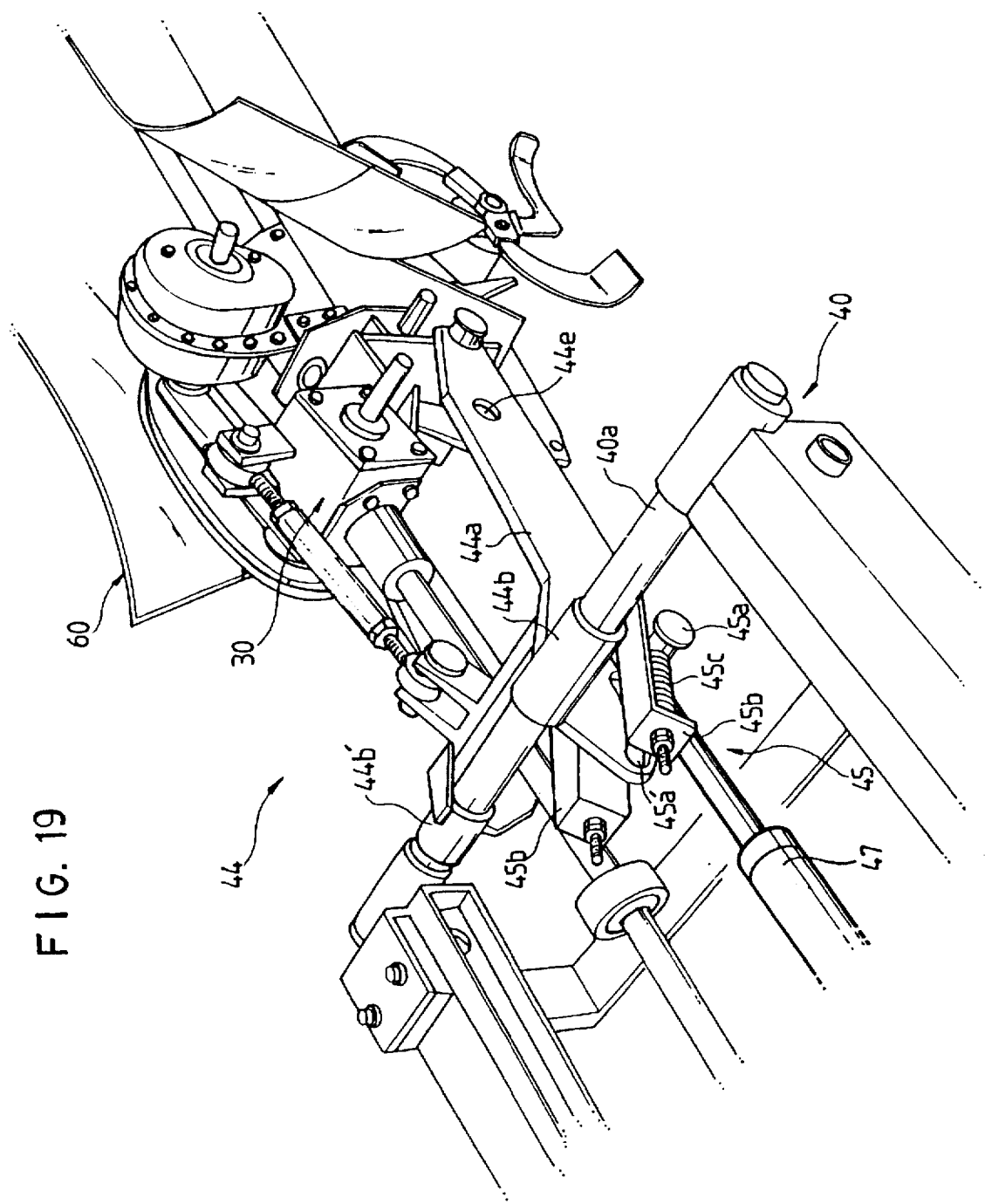

FIG. 19 is a perspective view showing the state which a cylinder is set up at another coupling device of the installation means of the present invention.

Figure 20:
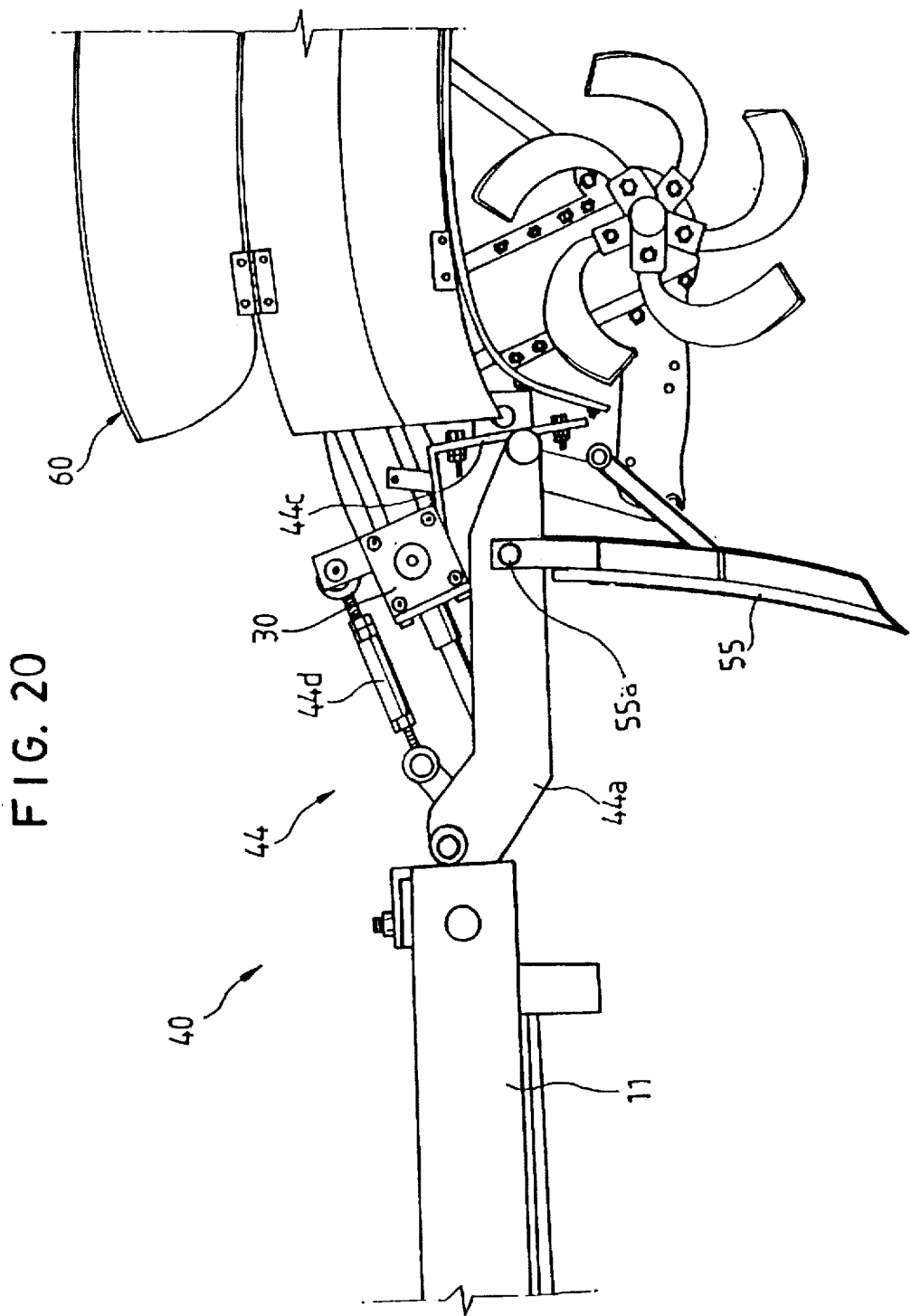

FIG. 20 is a side view showing the state which a plow for readjustment of arable land is set up at the coupling device of the installation means of the present invention.

Figure 21:
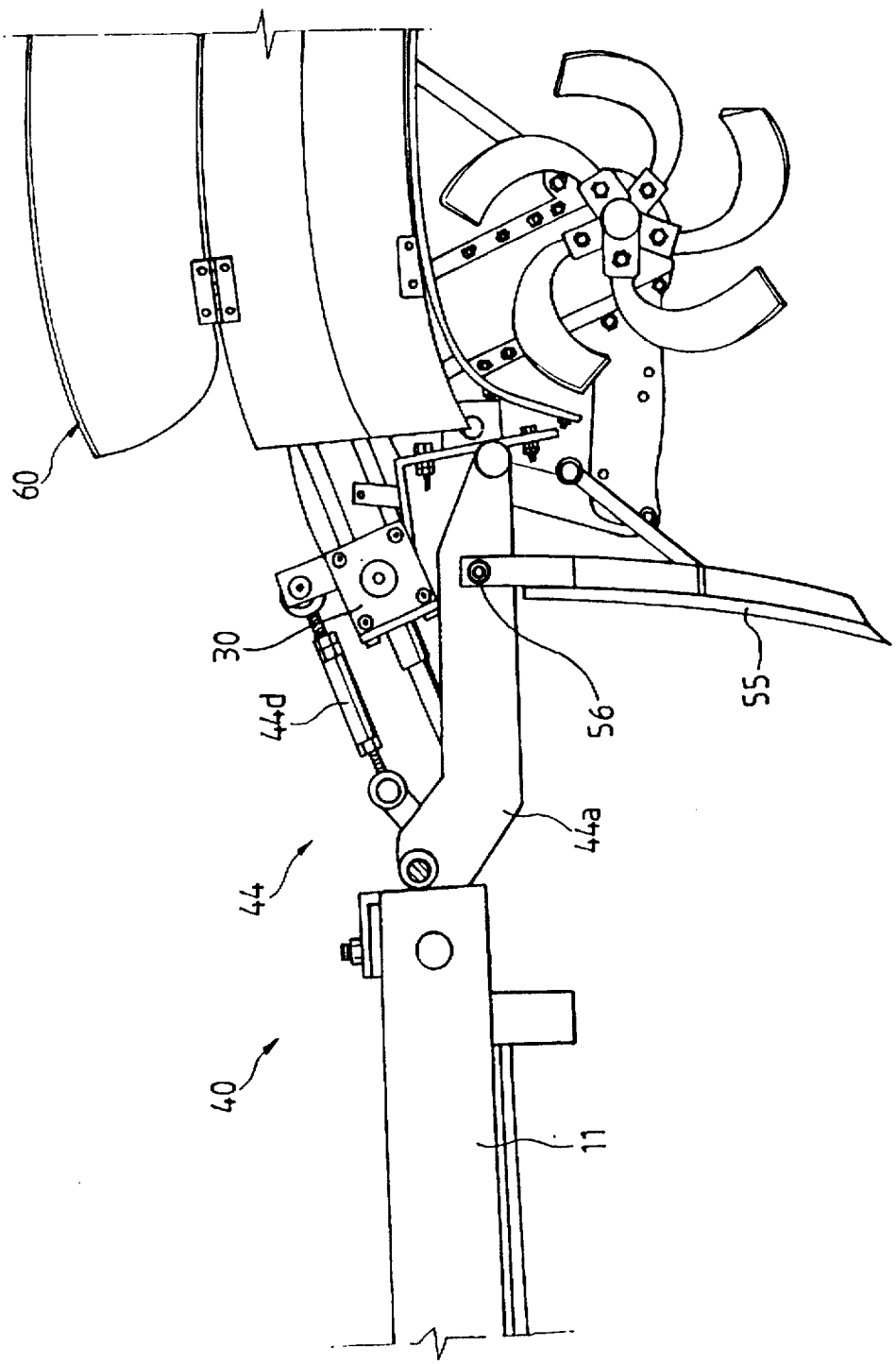

FIG. 21 is a side view showing the state which a coupling rod connects the to the installation means of the present invention.

Figure 22:
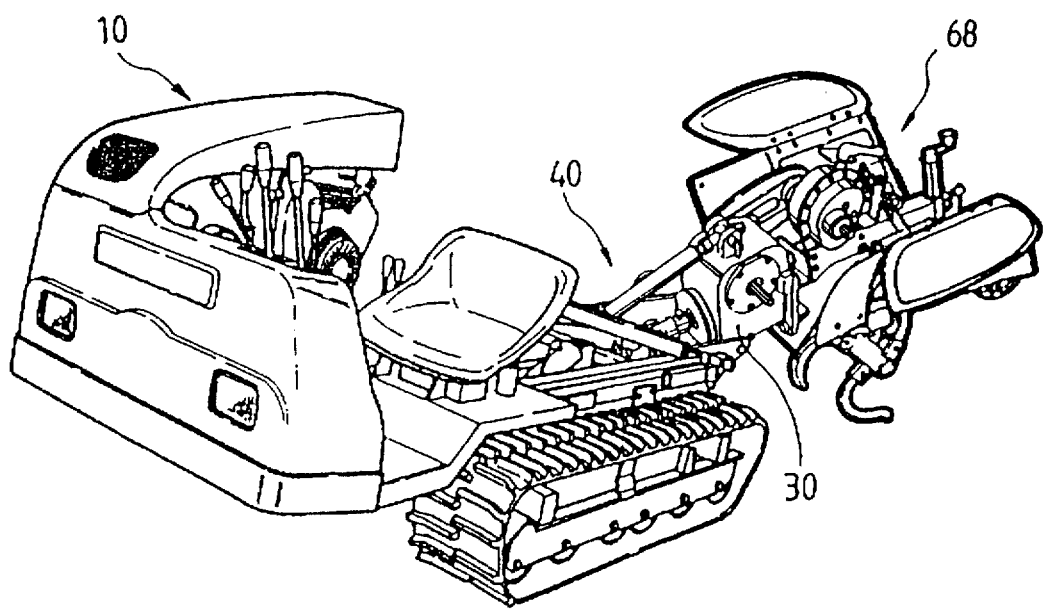

FIG. 22 is a perspective view showing the state which a plow is set up at the installation means of another embodiment of the present invention.

Figure 23:
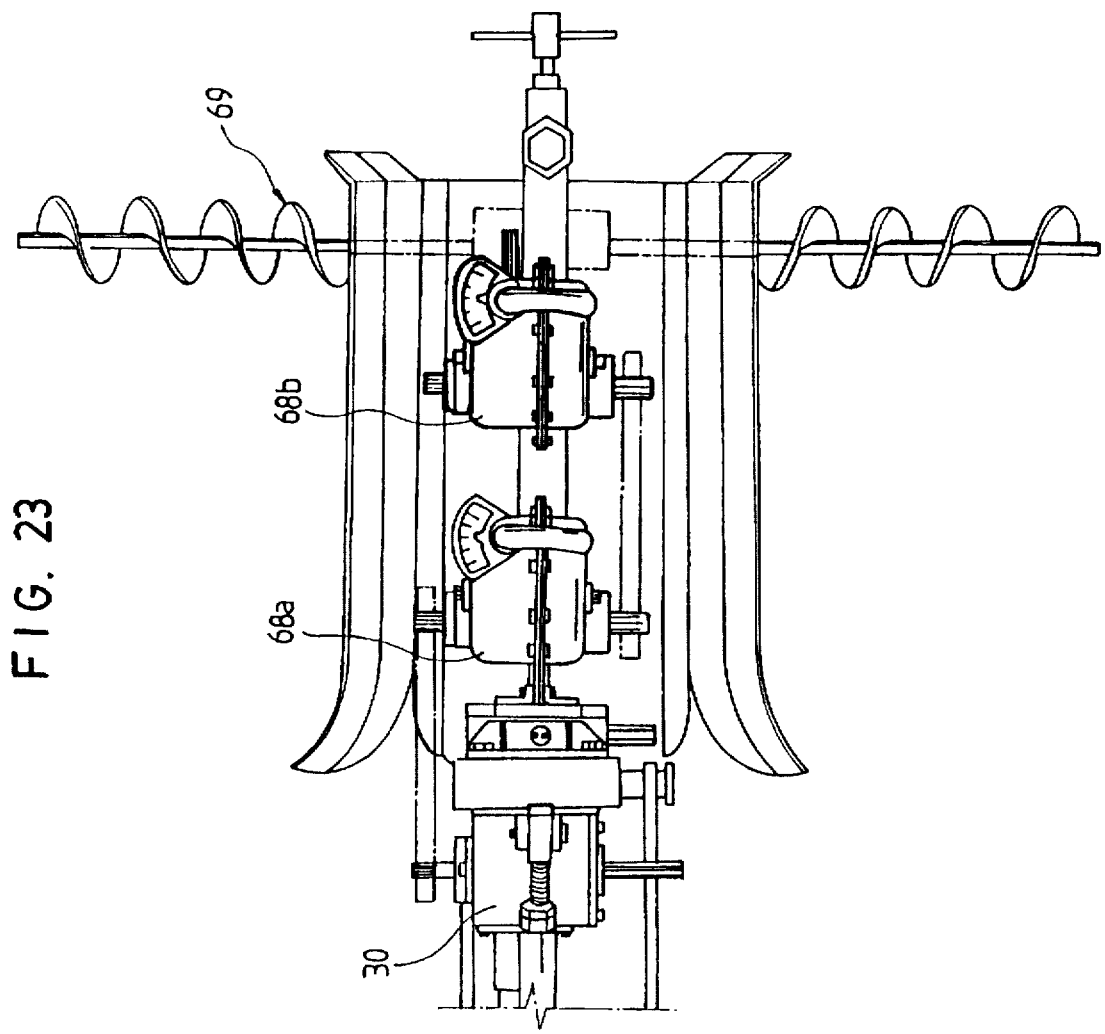

FIG. 23 is a plan view showing a plow to carry out side by side plowing work and a screw type machine for spreading earth of the present invention.

Figure 24:
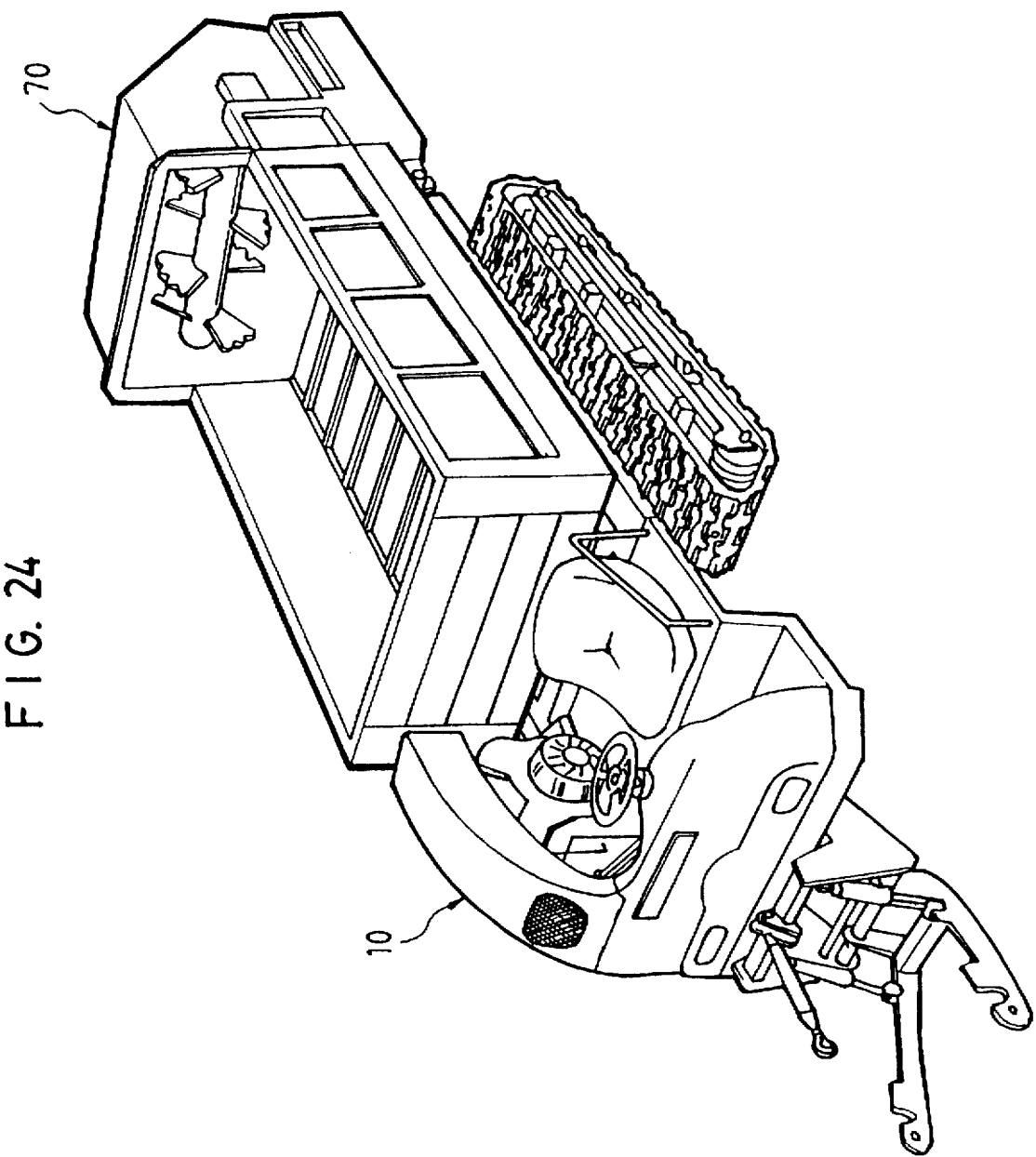

FIG. 24 is a perspective view showing the state in which a compost sprinkler is connected at the installation means of the present invention.

Figure 25:
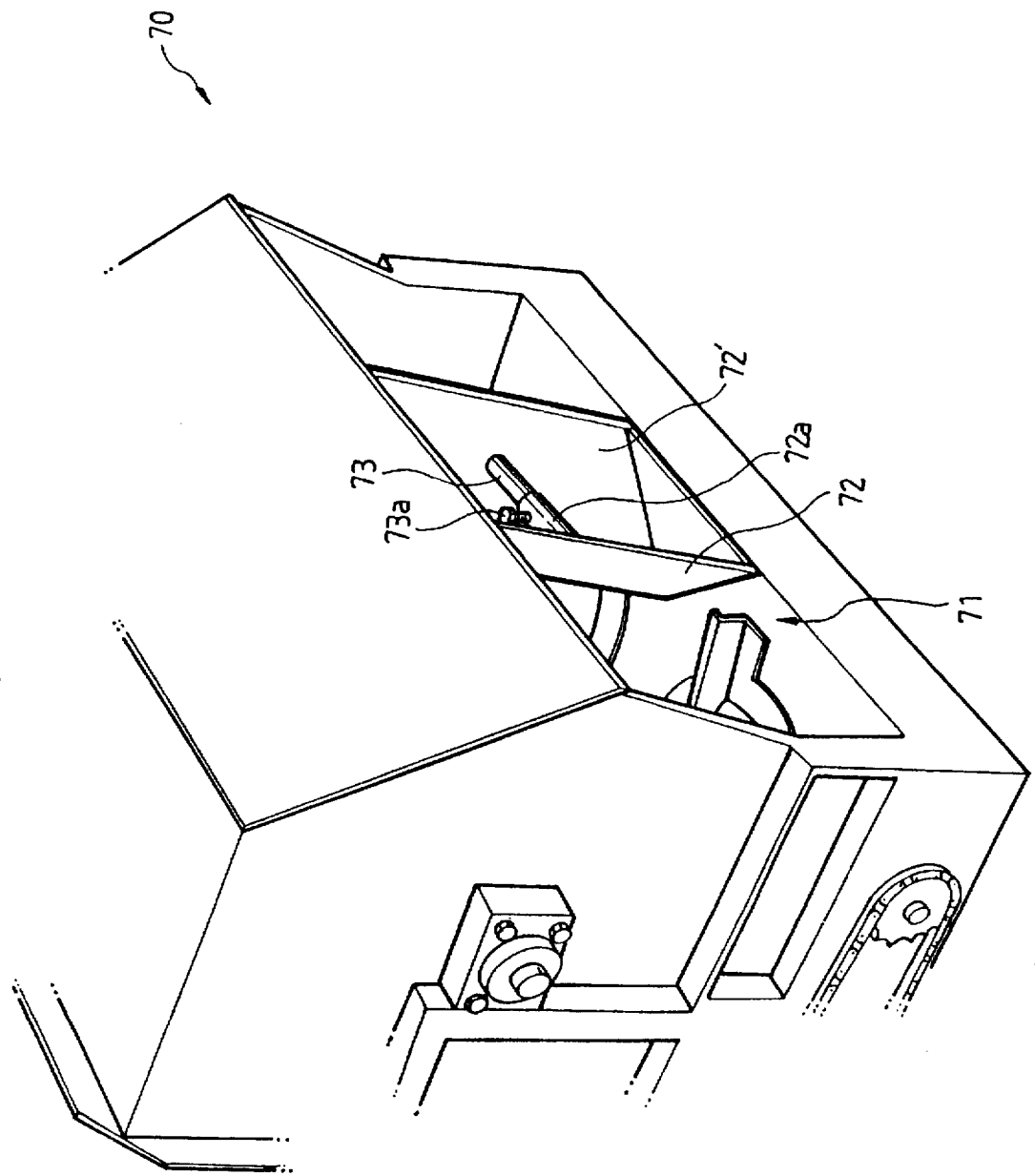

FIG. 25 is an institution state view showing the compost sprinkler with means for adjusting a compost sprinkling direction of the present invention.

Figure 26:
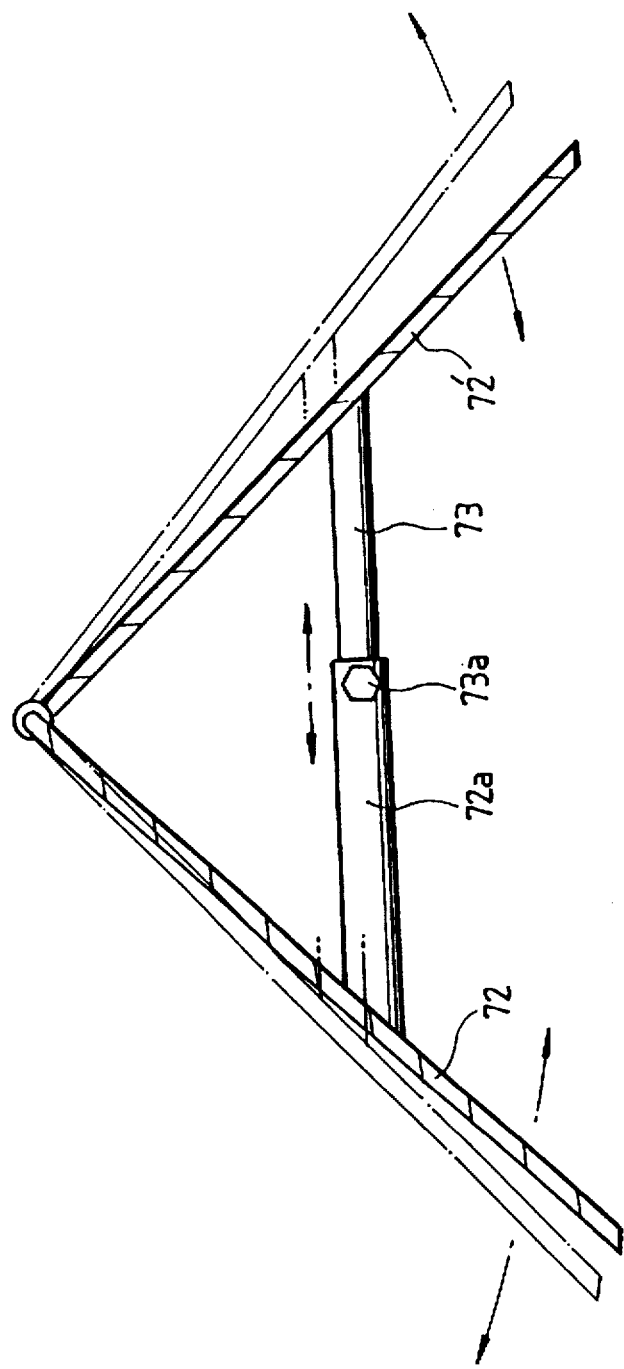

FIG. 26 is a main working state view showing the compost sprinkler with an adjustable compost sprinkling direction of the present invention.

Figure 27:
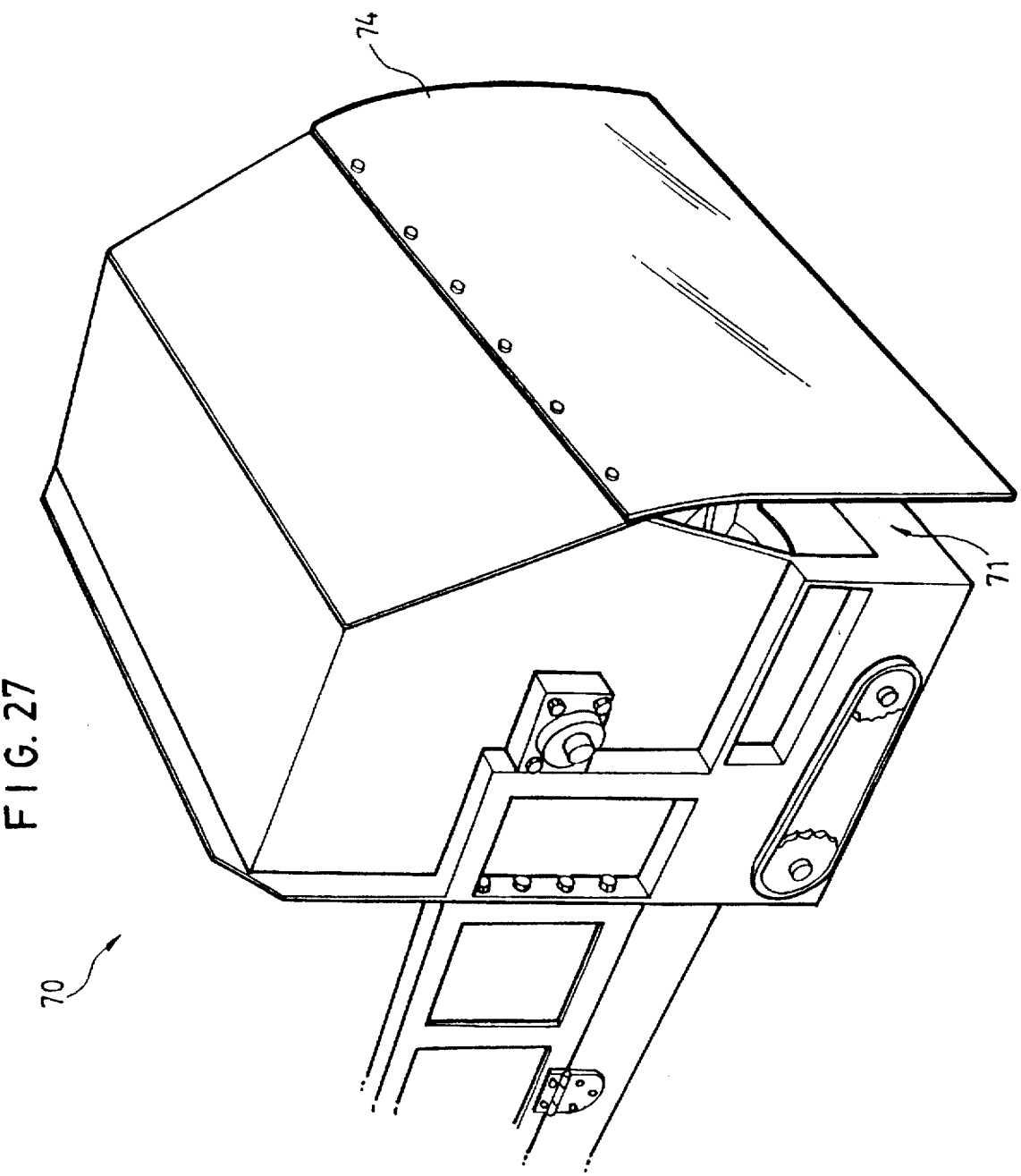

FIG. 27 is an institution state perspective view of the compost sprinkler for sprinkling compost directly under the compost sprinkler of the present invention.

Figure 28:
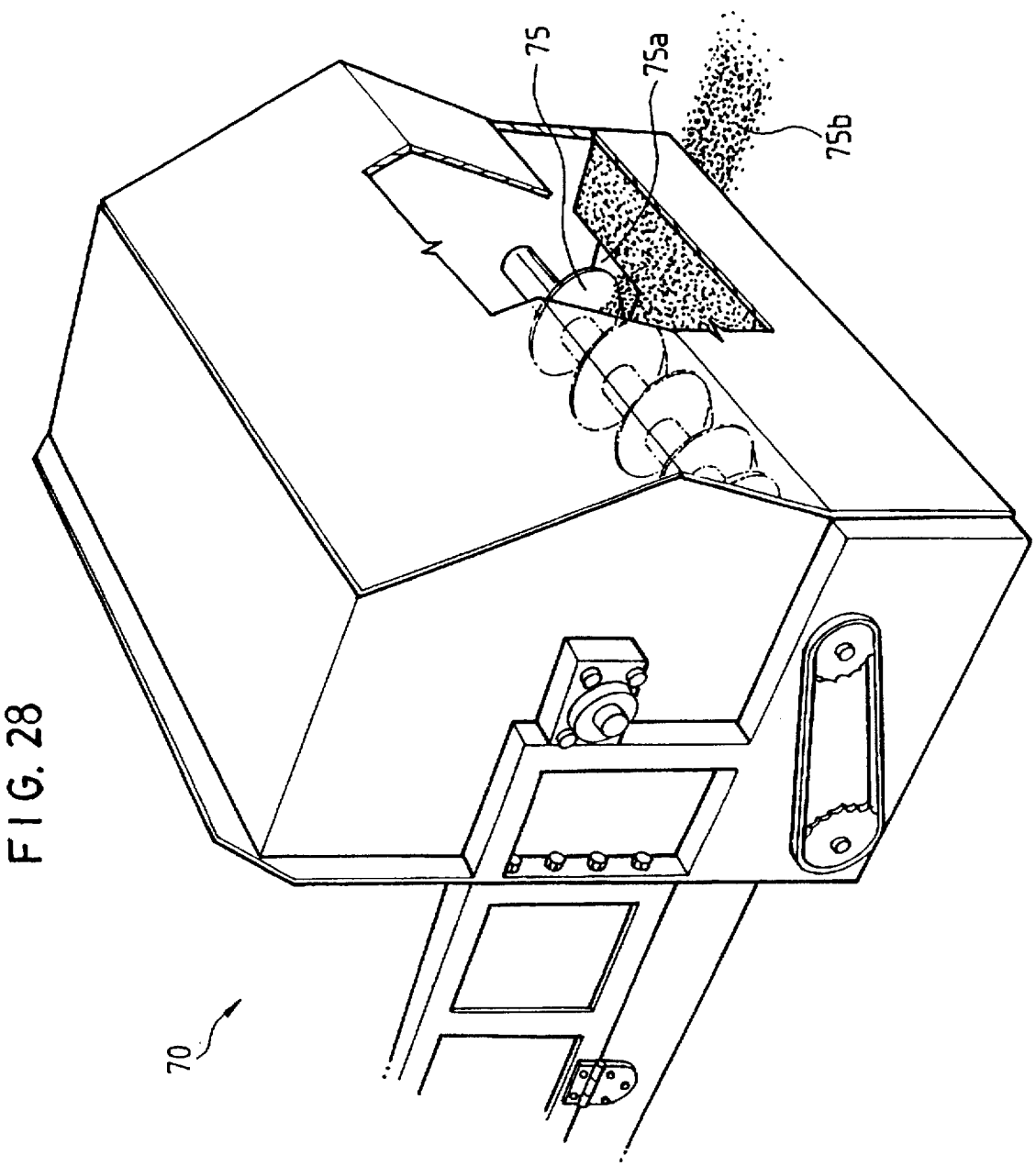

FIG. 28 is at perspective view of the compost sprinkler sprinkling compost at one side of the installation means of another embodiment of the present Invention.

Figure 29:
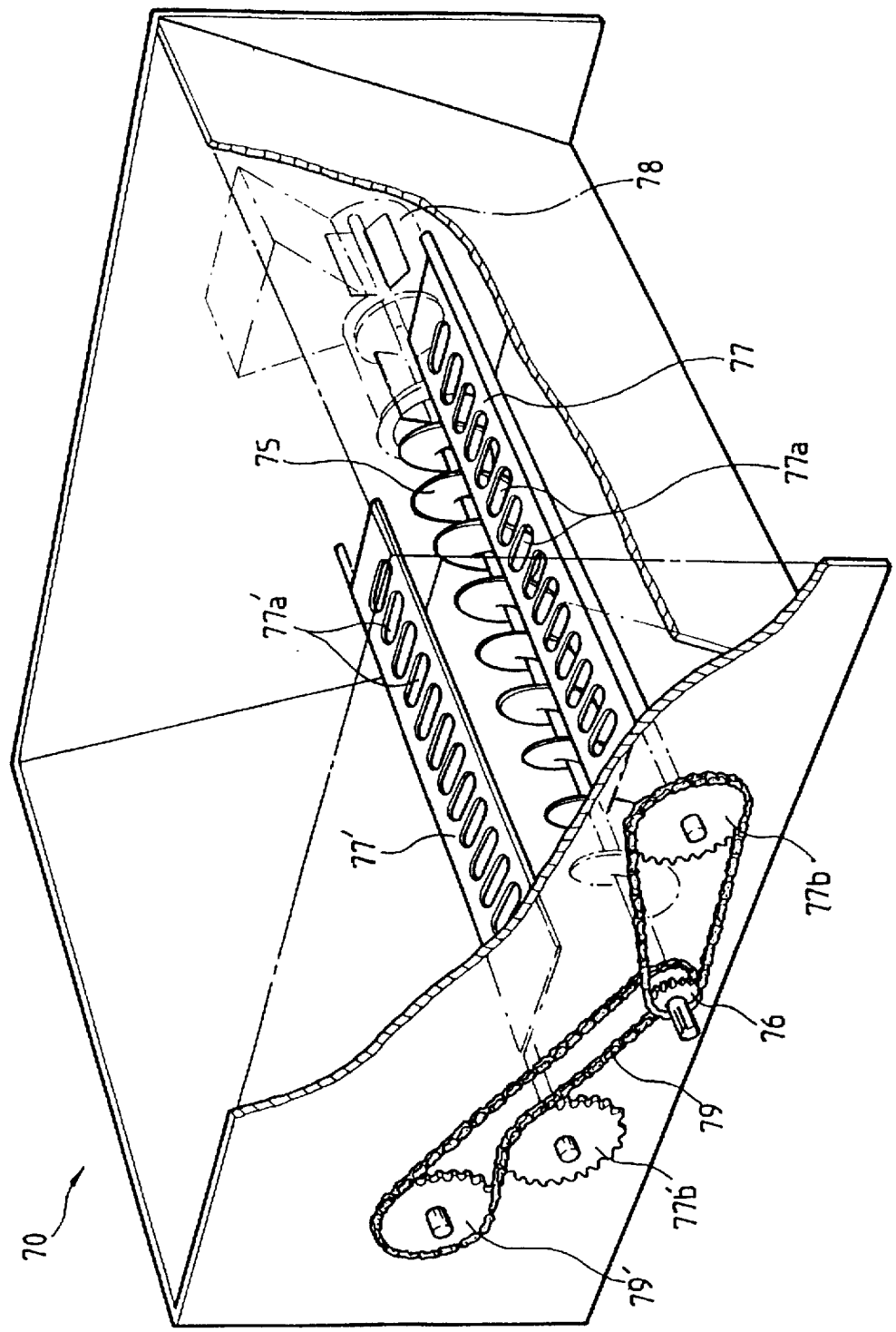

FIG. 29 is a perspective view showing another compost sprinkler connected to the installation means of the present invention.

Figure 30:
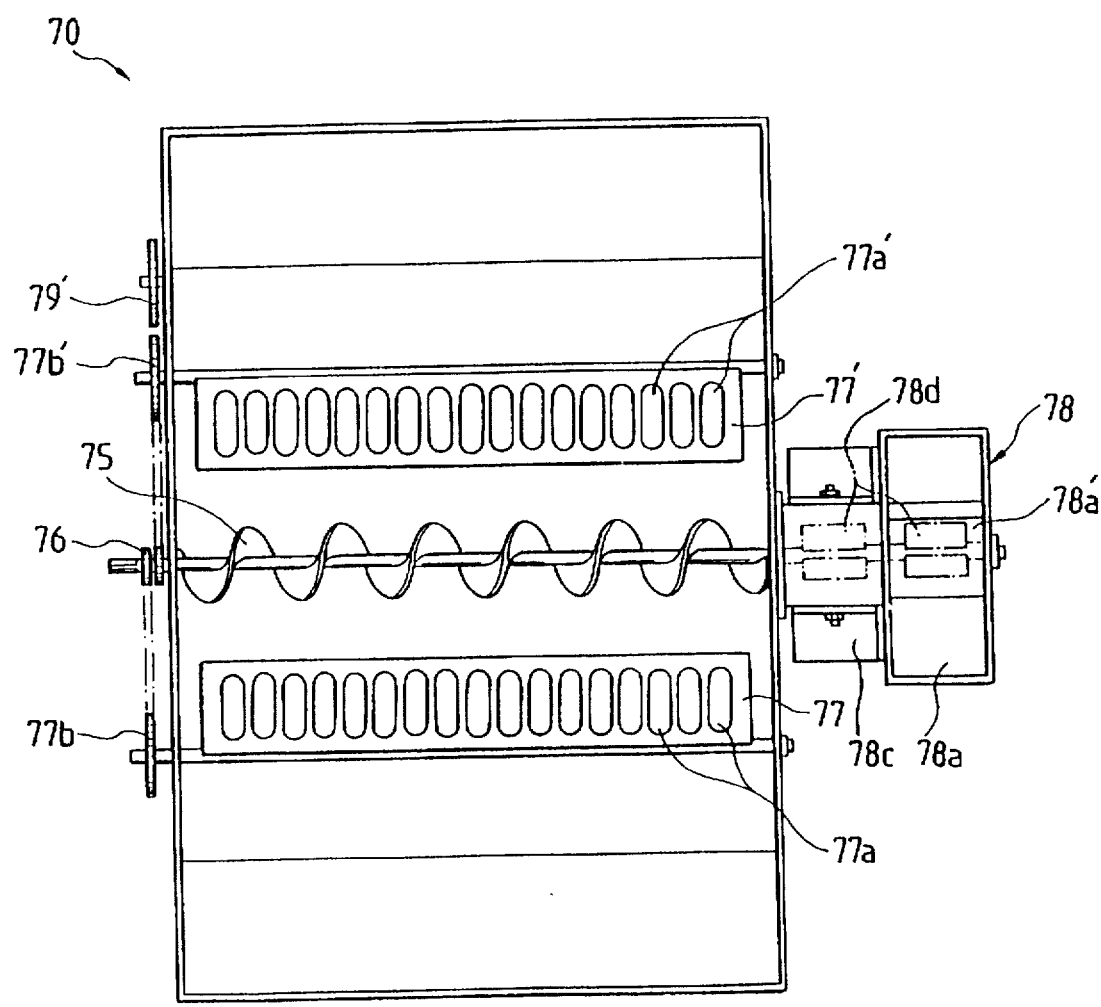

FIG. 30 is a plan view showing another compost sprinkler set up at the installation means of the present invention.

Figure 31:
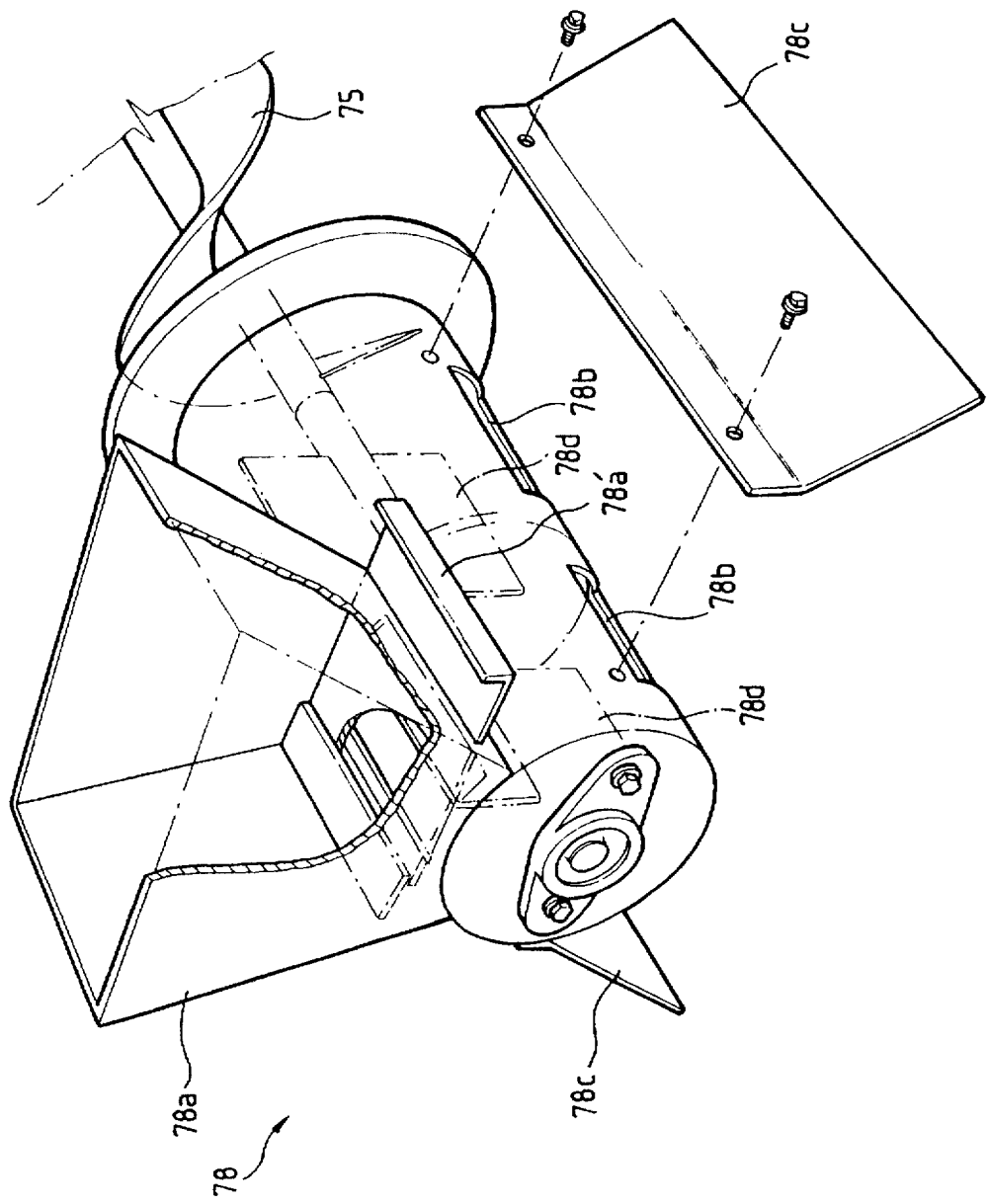

FIG. 31 is a perspective view showing another compost sprinkler set up at the installation means of the present invention.

Figure 32:
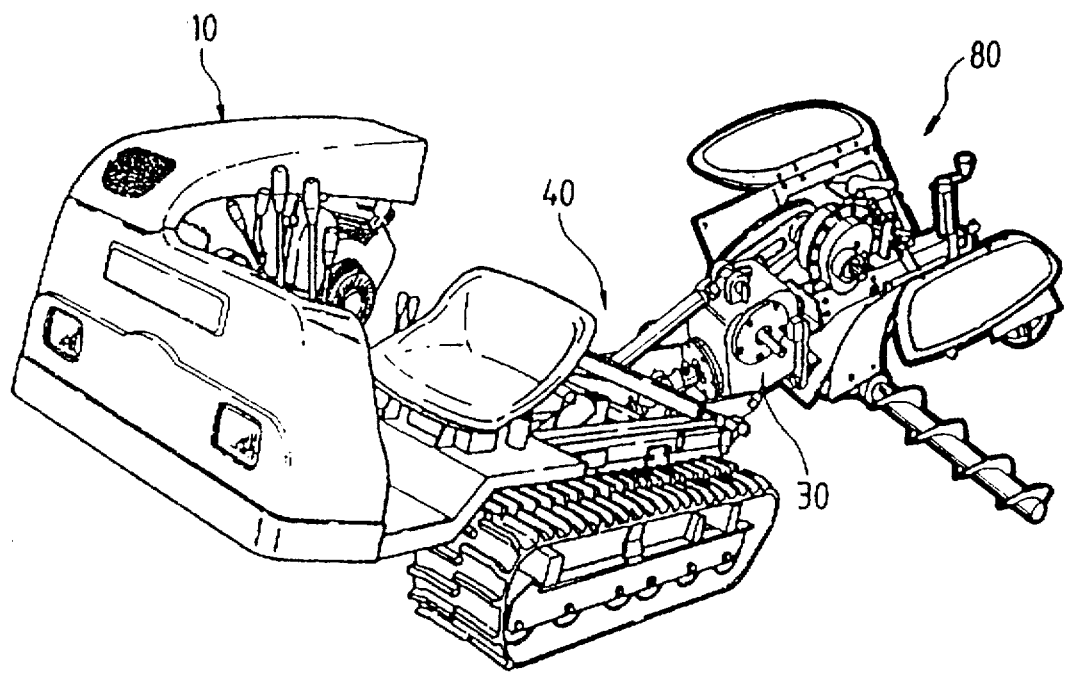

FIG. 32 is a perspective view showing the state which a machine for spreading earth is set up at the installation means of the present invention.

Figure 33:
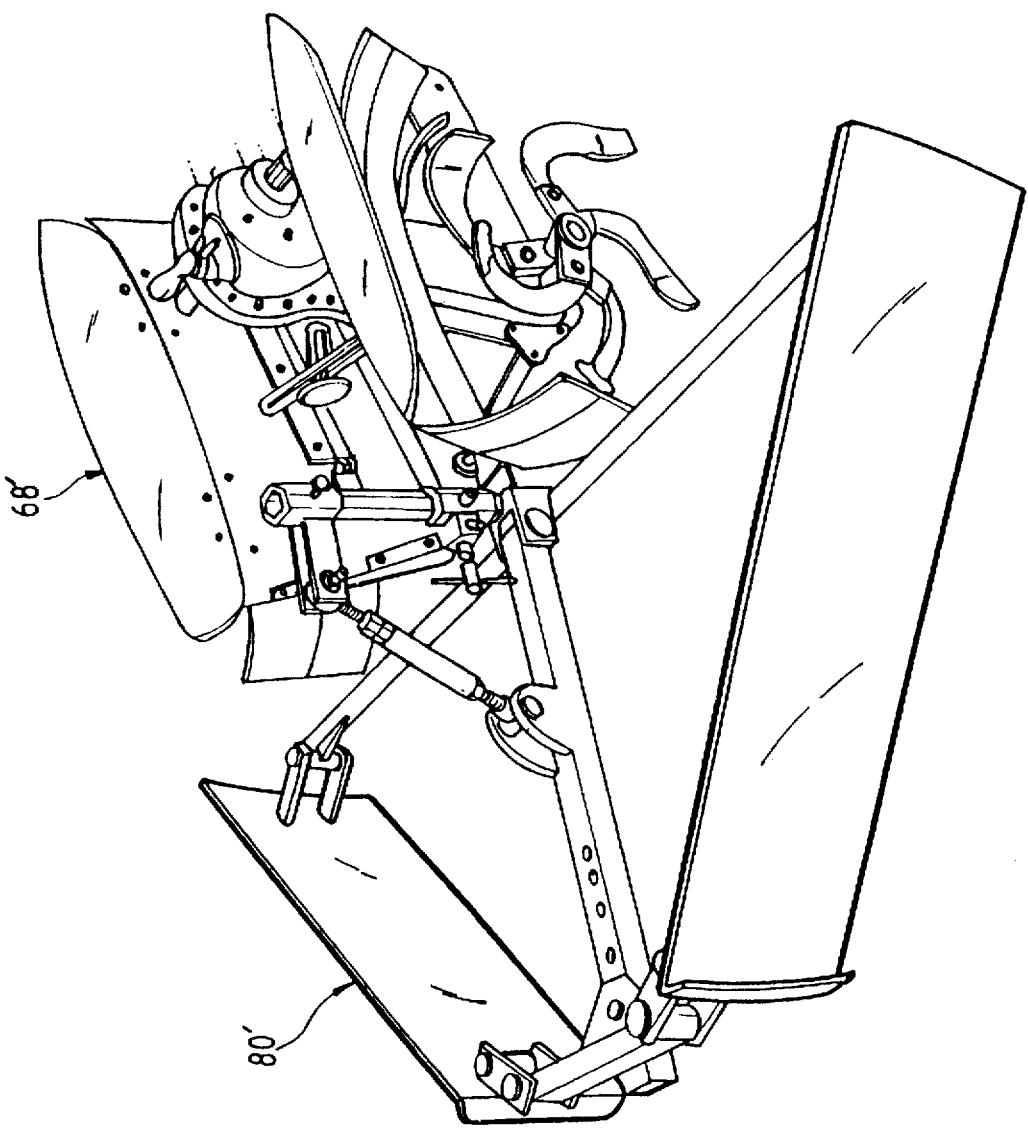

FIG. 33 is a perspective view showing a trencher for carrying out side by side trenching work and a machine for spreading earth also connected at the installation means of the present invention.

Figure 34:
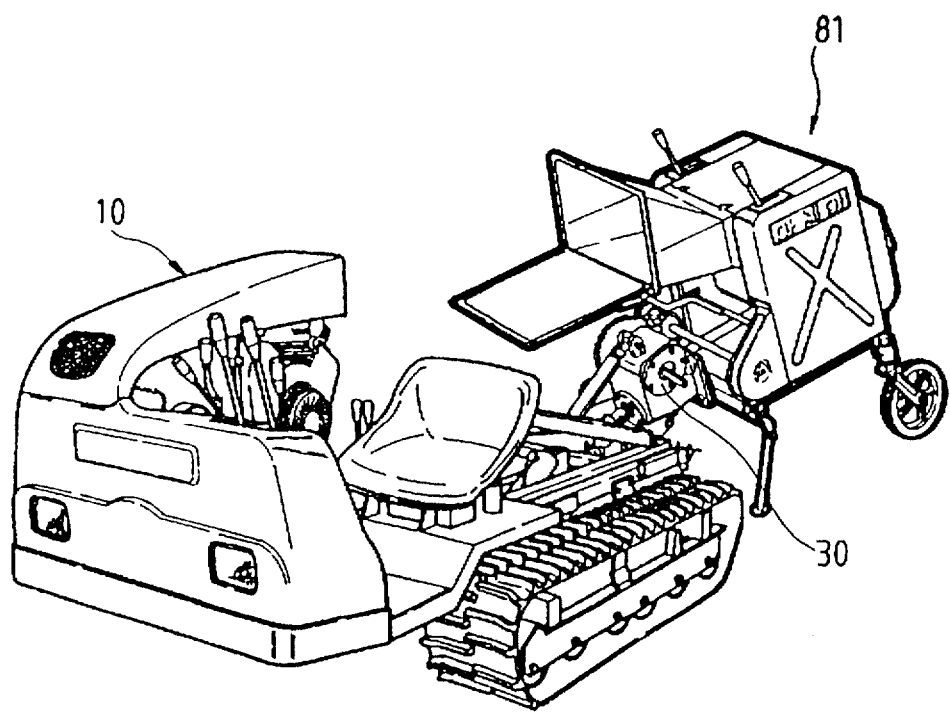

FIG. 34 is al perspective view showing a machine for crushing a twigs connected to the installation means of the present invention.

Figure 35:
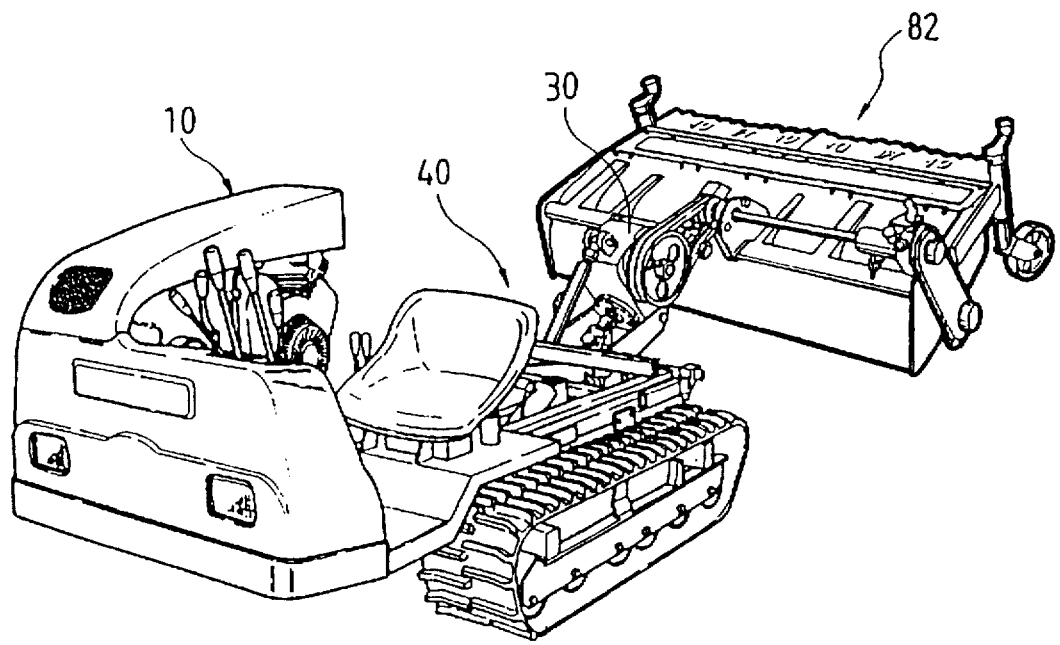

FIG. 35 is a perspective view showing a weeder connected to the installation means of the present invention.

Figure 36:
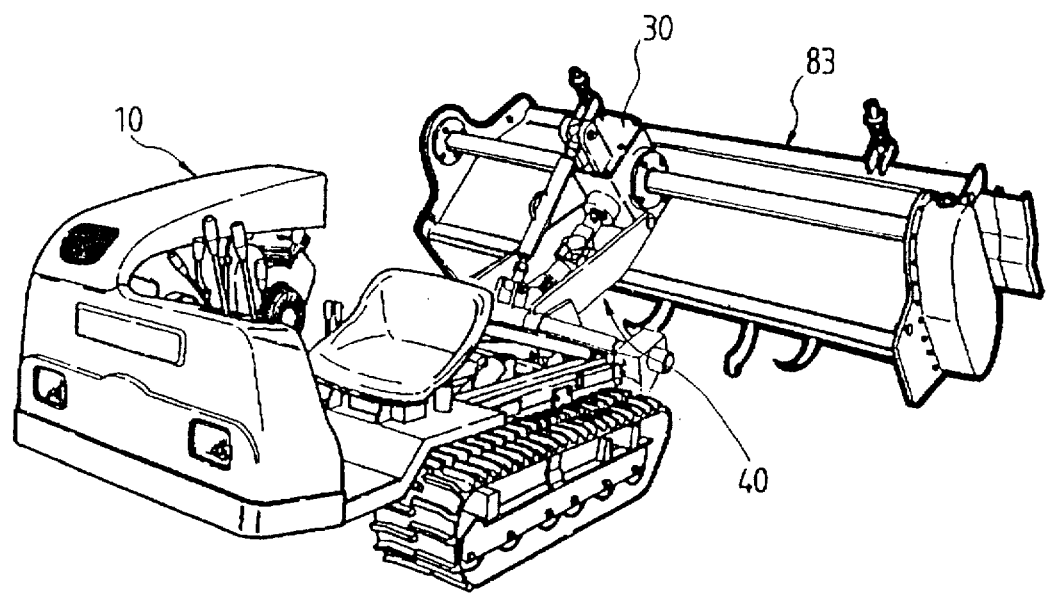

FIG. 36 is a perspective view showing a cultivation rotary connected to the installation means of the present invention.

Figure 37:
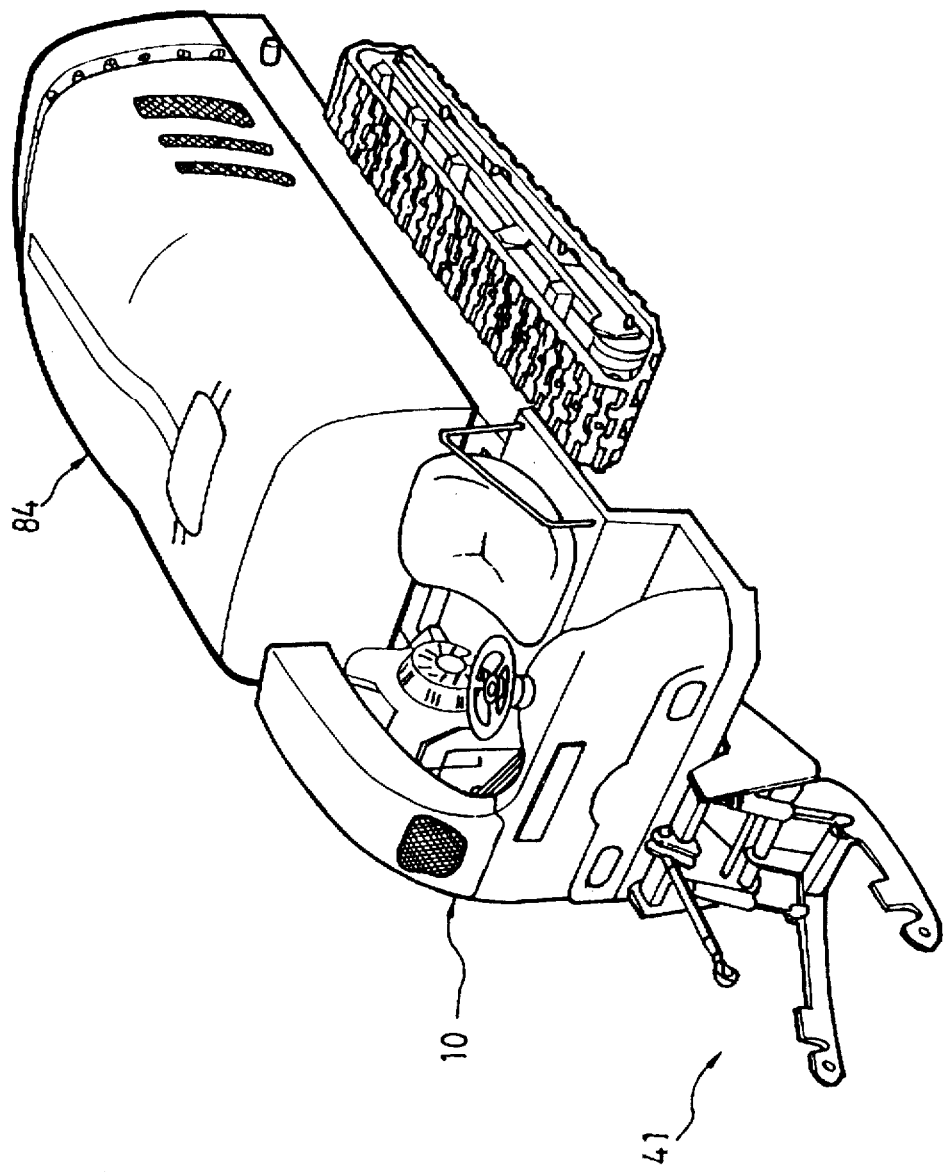

FIG. 37 is a perspective view of a machine for preventing damage by disease and pest connected to the installation means of the present invention.

Figure 38:
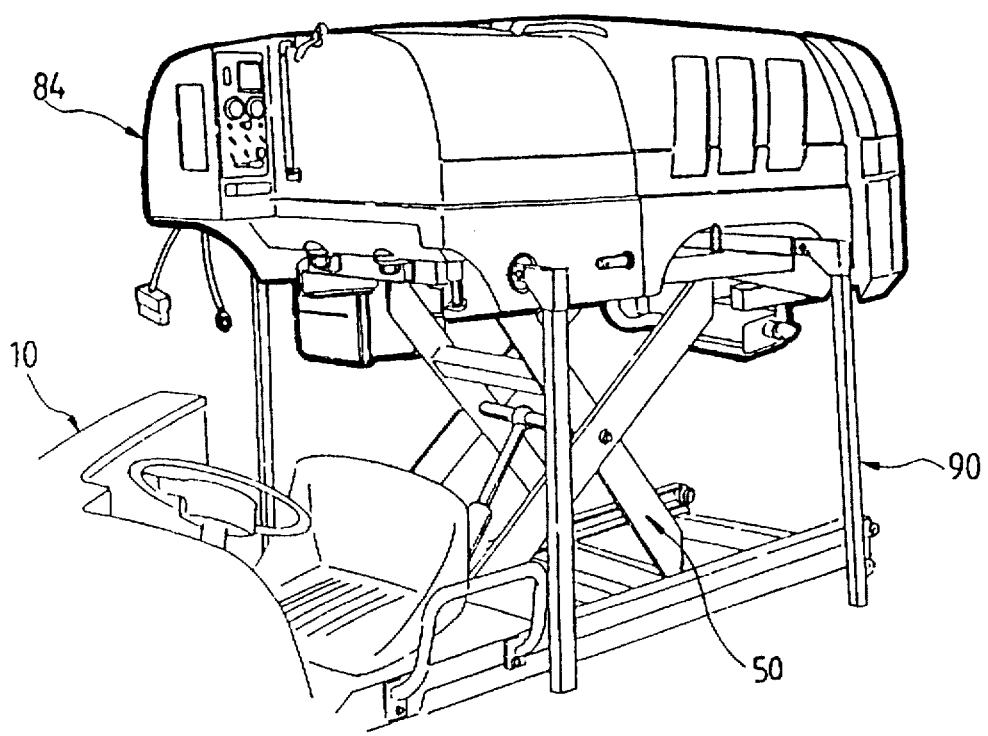

FIG. 38 is an institution state view of the state which a machine for preventing damage by disease and pest is connected to the installation means of the present invention.

Figure 39:
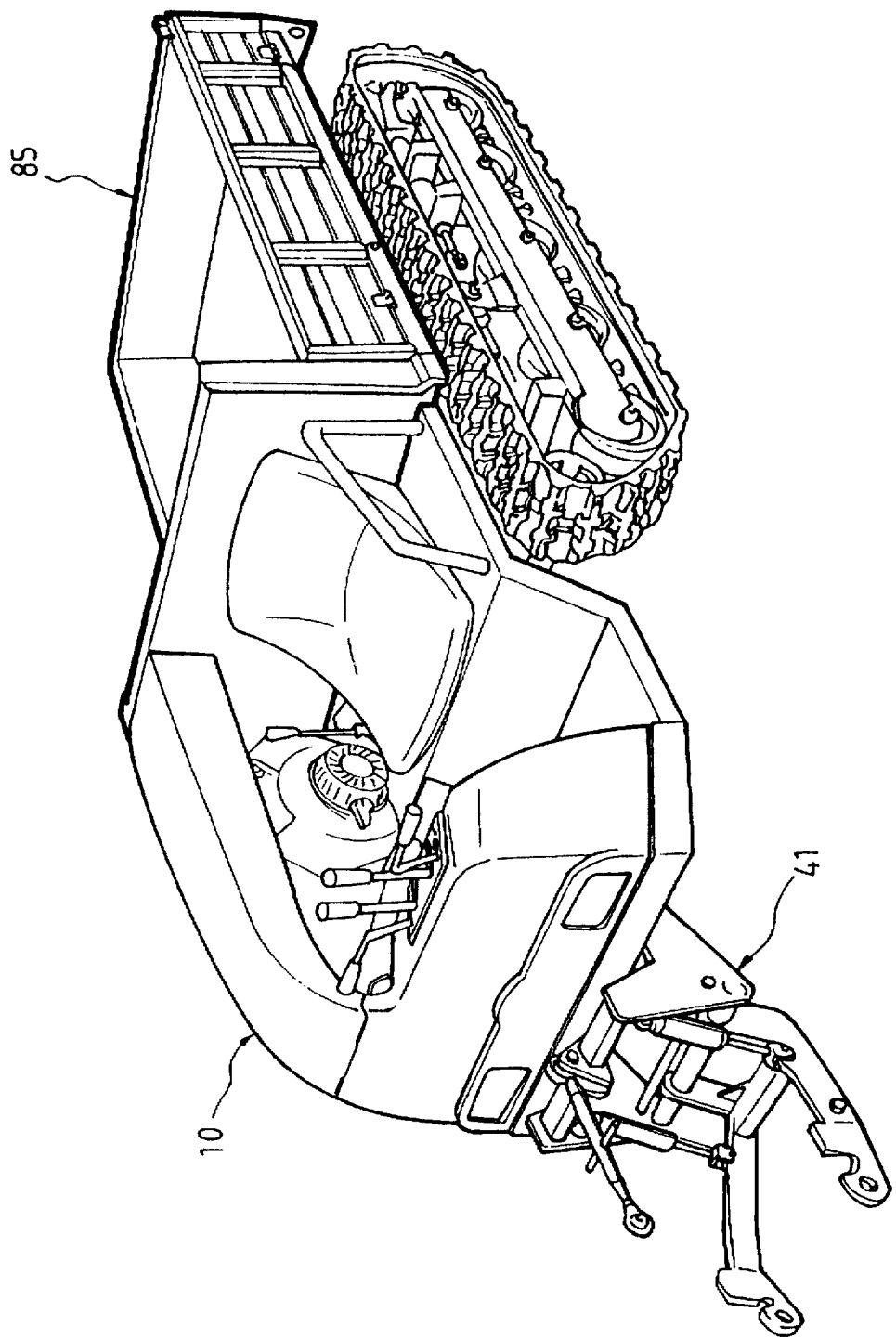

FIG. 39 is a perspective view of a loading box connected to the installation means of the present invention.

Figure 40:
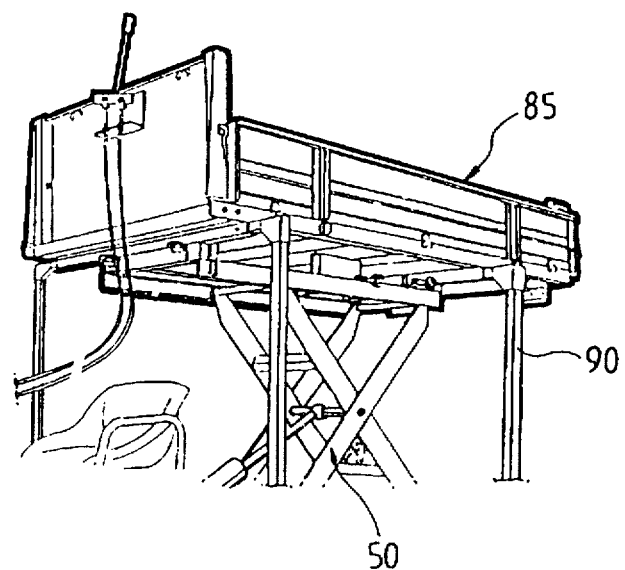

FIG. 40 is an institution state view of a loading box connected to tile installation means of another embodiment of the present invention.

DETAILED DESCRIPTION OF THE INVENTION

The present invention is explained in more detail referring to the attached drawings.

Figure 1:
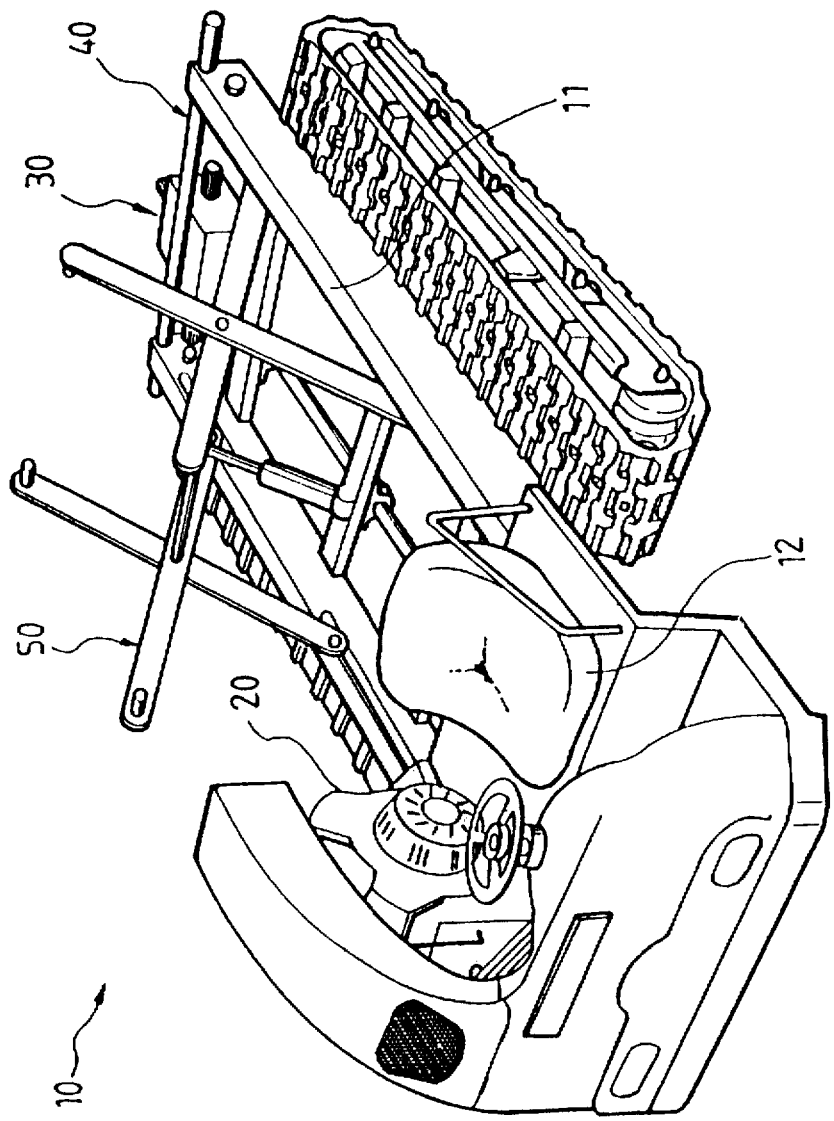
FIG. 1 is a perspective view showing the combined control machine car body of the present invention.
Figure 2:
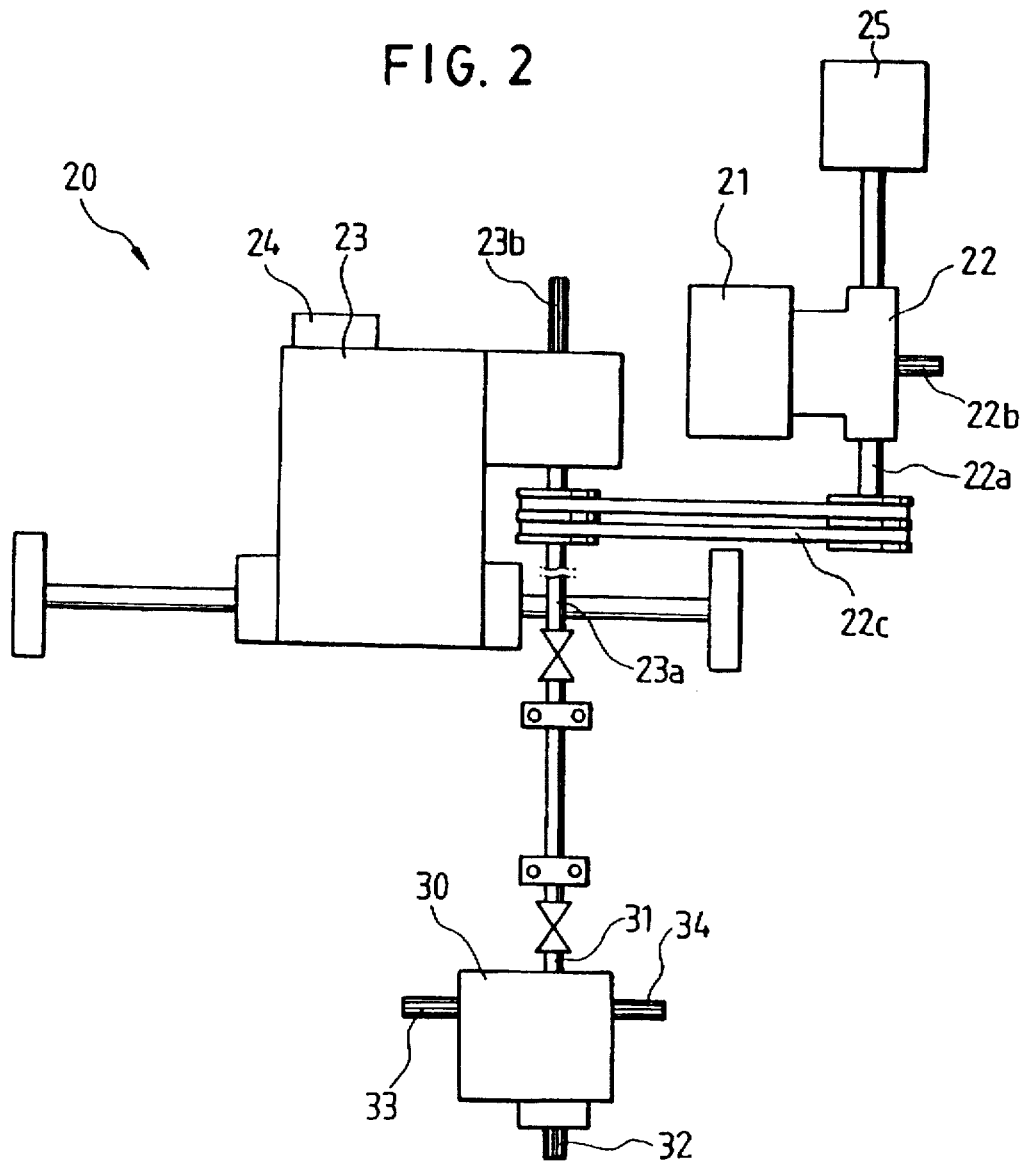
FIG. 2 is a summary view showing the power transmission relation of the present invention.

Referring to FIGS. 1 and 2, a combined control machine car body 10 has a chassis 11, on which is mounted a driving device 20, installation means 40, for attaching various working machine attachments 60 (not shown in FIGS. 1 or 2) for various types of orchard tasks as required, and means for ascending, descending, and lifting 50. Driving device 20, mounted at a front side of combined control machine car body 10, provides the force to propel combined control machine car body 10 and transmits power to various cylinders (not shown in FIGS. 1 and 2) and hydraulic means 25 which in turn drive various working machine attachments 60. Driving device 20 also provides power for installation means 40 and means for ascending, descending, and lifting 50.

A conventional drive means (engine) 21, located along side a driver seat 12 of combined control machine car body 10, is directly coupled to a reduction gear 22. Reduction gear 22 rotates a power shaft 22a which transmits the power of drive means 21 to a transmission 23 via a belt drive 22c. Reduction gear 22 also drives hydraulic means 25, including an air compressor 26 (shown in FIG. 10), and is used as a power source for all necessary working machine attachments 60 to perform all required tasks in an orchard. Reduction gear 22 also rotates a side power shaft 22b, substantially perpendicular to power shaft 22a, making the simultaneous performance of various tasks possible.

Transmission 23 receives power from an input shaft 23a, which is rotated by belt drive 22c. A front power shaft 23b extends in front of input shaft 23a, making power available at the front of combined control machine car body 10 for various types of working machines attachments 60 which may he necessary at that location without requiring another power source. Front power shaft 23b also makes simultaneous performance of various tasks possible.

A PTO gear box 30 is located in the rear of combined control machine car body 10, driven by input shaft 23a of driving device 20. PTO gear box 30 includes side power shafts 33 and 34 in both sides and provides power for various types of working machine attachments 60 which may he necessary it the rear of combined control machine car body 10. For example, FIG. 23 shows a machine for spreading earth 69 being powered by PTO gear box 30. A rear power shaft 32 is located at a rear side of PTO gear box 30, transmitting to various types of working machine attachments. For example, a machine for digging 68 is shown attached to the rear of the combined control machine car body 10 in FIG. 22. An additional power source is unnecessary because drive means 21 drives both combined control machine car body 10 and machine for digging 68.

Figure 3:
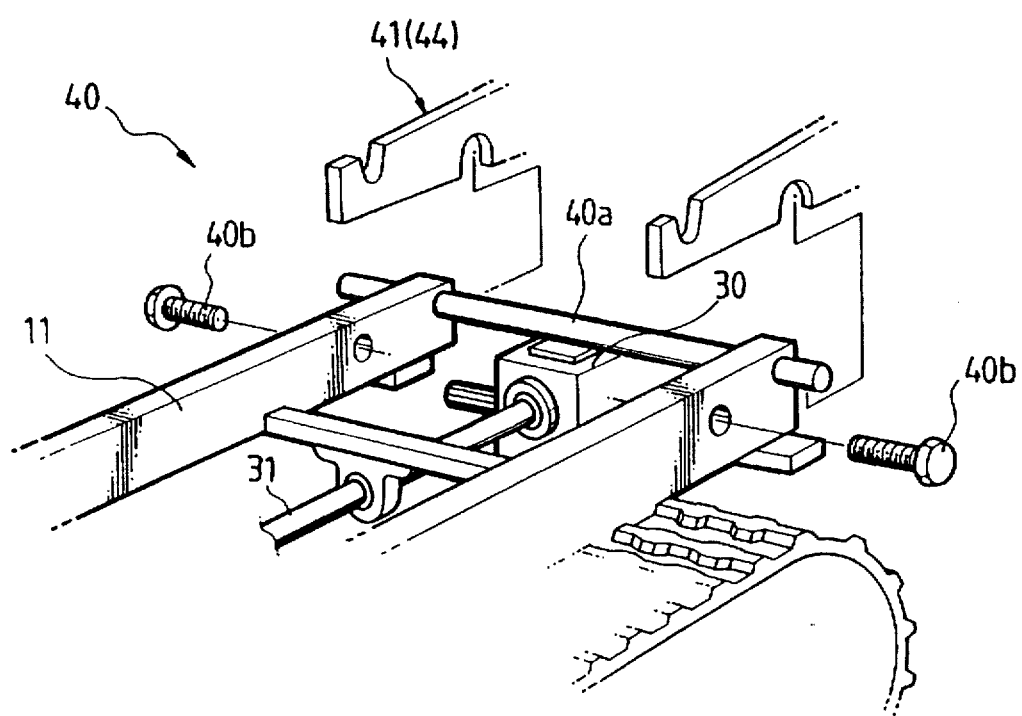
FIG. 3 is a perspective view showing the installation means of the present invention.

Referring now to FIG. 3, installation means 40 is connected to both the front and the rear of chassis 11 to connect various types of working machine attachments 60. An installing rod 40a and a fixed pin 40b connect coupling devices 41 and 44 at both the front and the rear of chassis 11. Accordingly, various types of working machine attachments 60 are mounted on coupling devices 41 and 44 and various types of the orchard tasks can be performed, as shown in FIGS. 22 and 24, for example.

Referring also to FIG. 4, a hydraulic motor 62, receiving a hydraulic supply from hydraulic means 25 (not shown in FIG. 4), is located at working machine attachment 60. The power to working machine attachment 60 is controlled by an operator of combined control machine car body 10 while driving combined control machine car body 10, because only one power source is required for hydraulic motor 62 and combined control machine car body 10.

Referring now to FIG. 5, various types of working machine attachments 60 may include a cylinder 61, receiving hydraulic power from hydraulic means 25 (not shown in FIG. 5). Cylinder 61 controls a vertical position of working machine attachment 60 responsive to irregularities in the topography of the ground underneath as working machine attachment 60 is pulled or pushed across the ground. A hydraulic control valve 63 controls the hydraulic supply to cylinder 61 responsive to a lever 63a. A control rod 65 is forced up and down by the irregularities in the topography of the ground. A link 64 is connected at one side to lever 63a. A spring 65a, between a fixed board 66 and one end of control rod 65, forces the one end of control rod 65 against a sensing strip 67 which is held against the ground. The opposing end of control rod 65 moves another side of link 64 up and down. Link 64 is pivotally attached via a fulcrum point to working machine 60. Sensing strip 67 oscillates up and down owing to the irregular topography of the ground. Using this configuration, a trench can be dug at a uniform depth no matter how irregular the topography of the ground is.

Referring now to FIG. 6, to perform work at high elevations, means 10 for ascending, descending, and lifting 50, located at a center part of chassis 11, has two pairs of lifting boards 51. Each pair is joined at the center of each lifting board 51, such that each pair forms an X. An inserting pin 51b is located at an external lower end of each lifting board 51. Inserting pins 51b correspond to inserting grooves 11a of chassis 11. Means for ascending, descending and lifting 50 also has, in the inner upper part of each lifting board 51, a projecting pin 51c. Projecting pins 51c hold up a working platform 57. Working platform 57 is ascended up and descended down by the front and the rear transfer of inserting pins 51b as depicted in FIG. 7(A). A cylinder 52, connected between a fixed strip 11b, of chassis 11, and supporting shaft 51a, which connects the centers of each pair of lifting boards 51, powered by hydraulic means 25, puts into effect the ascending and descending of lifting boards 51. Orchard tasks at high elevations can be easily performed using working platform 57 or any other working machine attachment 60 which is held by projection pins 51c of lifting boards 51. 25 Referring to FIG. 8, in another embodiment of driving device 20, a front power shaft 23b is connected to transmission 23. A PTO gear box input shaft 31 is connected to the rear of front power shaft 23b and is therefore driven directly by transmission 23 also. The operator on said combined control machine car body 10 can control the speed and the turning direction of front power shaft 23b and PTO gear box 30 easily. In addition, the operator can transmit power to working machine attachment 60 in front of combined control machine car body 10 easily. Since various types of working machine attachments are connected without another power source in front of said combined control machine car body 10 can be easily achieved, multiple fruit culture tasks can be effectively performed, simultaneously.

Referring to FIG. 9, a further embodiment of drive means 20 includes a means for changing speed 24 connected to transmission 23. The means for changing speed includes a driving speed change lever 24a and a PTO speed change lever 24b. In this embodiment the driver can separately control the speed and direction of combined control machine car body 10 and PTO gear box 30.

Referring now to FIG. 10, an embodiment of hydraulic means 25 includes a hydraulic pump 25a which receives power from power shaft 22a of reduction gear 22. This power source can be used to move many cylinders (not shown in FIG. 10) in various working machine attachments 60 and said means for ascending, descending and lifting 50. Hydraulic pump 25a can also be used as a power source to operate an ordinary hydraulic motor or cleansing pump 28. Cleansing pump 28 is located at a transfer means for combined control machine car body 10 which is an ordinary wheel or track. Cleansing pump 28 directs high pressure air or fluid at the transfer means to remove debris which may result from the various fruit culture tasks which may be performed. The operator on said combined control machine car body 10 can perform all fruit culture tasks from driver seat 12.

A further embodiment of hydraulic means 25 includes an air compressor 26 driven by power shaft 22a of reduction gear 22 at a conventional air tank. The use of air from the air tank at said combined control machine car body 10 is easily performed and at the same the various types of tasks for fruit culture can be simultaneously performed.

Referring to FIG. 11(A), a coupling device 41 is mounted on installation means 40 with inserting grooves 41a' and 41a" at the front top and bottom of supporting boards 41a corresponding to installing rod 40a and fixed pins 40b of installation means 40, respectively. A supporter 41b having a fixed coupling rod 41b' is rotatably connected between supporting boards 41a at an upper rear portion of coupling device 41, so that fixed coupling rod 41b' pivots up and down. Supporter 4b is used to couple various types of working machine attachments 60 at the rear of combined control machine car body.

A loading stand 41c, pivotally connected at a lower rear portion of coupling device 41 to turn freely up and down such that various types of working machines attachments 60 can be easily connected. A supporter 41c', at the lower inside of loading stand 41c, provides additional supporting strength to loading stand 41c. A cylinder 42 receives hydraulic supply from hydraulic pump 25a (not shown in FIG. 11(A)). Cylinder 42 is connected between supporting board 41a and loading stand 41c. Since loading stand 41c rotates up and down, various types of working machine attachments 60 are easily installed on coupling device 41, as necessary for the many fruit culture tasks that exist. Since coupling devices 41 are at both the front and rear of combined control machine car body 10 (see FIG. 11(B)), multiple fruit culture tasks can be more easily performed.

Referring to FIG. 12, a further embodiment of coupling device 41 includes an installing groove 41d and a fixed hole 41e at the rear side of loading stand 41c to facilitate the easy installation of working machine attachment 60. Since the installation of working machine 60 is easily performed, multiple fruit culture tasks are more easily accomplished.

Referring to FIG. 13(A) and 13(B), a further embodiment of coupling device 41 includes a connecting device 43 equipped with a connecting board 43a. Connecting device 43 mounts on installing groove 41d and fixed hole 41e of loading stand 41c. Connecting device 43 is used to connect small size working machine attachments 60 which have a matching connecting board 43a'. Connecting device 43 allows for even broader range of fruit culture tasks to be performed.

Referring to FIG. 14, a second coupling device 44 includes installing rod insertion pipes 44b and 44b' connected to the upper side of supports 44a and 44a, respectively. Insertion pipes 44b and 44b' slide over installing rod 40a of installation means 40. An elastic supporting tool 45 connects to the lower part of installing rod insertion pipes 44b and 44b' maintaining elasticity in the connection of working machine attachment 60 at the rear part of coupling device 44. A coupling board 44c with many fixed holes 44c' at the rear side of coupling device 44 facilitates the installation of various types of working machine attachments 60.

Referring now also to FIG. 15, PTO gear box 30 connects to an upper part of machine coupling board 44c to transmitting power, received from driving device 20, to working machine attachment 60. A coupling rod 44d connected at both ends with screw rods 44d' and 44d" between PTO gear box 30 and coupling device 44 allow for an adjustment of the position of PTO gear box 30. The installation and detachment, and the gradient of working machine attachment 60 can be easily controlled. Working machine attachment 60 is driven by PTO gear box 30.

Referring now to FIG. 16, another embodiment of coupling device 44 of said installation means 40 includes a power transmission shaft 46 connected to one end of input shaft 31. The other end of power transmission shaft 46 is connected to PTO gear box with two universal joints. Accordingly, a position of PTO gear box 30 can be adjusted to connect to various types of working machine attachments 60 and power is easily transmitted by input shaft 31 to PTO gear box 30. In addition, the power of said combined control machine car body 10 can be easily transmitted to working machine attachment 60 connected to coupling device 44. The operation of all working machine attachments 60 installed on combined control machine car body 10 can be smoothly performed and the various working machines 60 can be easily used.

Referring to FIGS. 17 and 18, elastic supporting tool 45 of coupling device 44 includes a spring 45c with a supporting pin 45a located at one end inserted in a supporting pin insertion hole 45a', having an arc shape, at one side of supports 44a and 44a'. The other end of spring 45c connects to a fixed board 45b at one side of rod insertion pipes 44b and 44b'. Accordingly, if working machine attachment 60 is jolted during the work process, the shock is absorbed by spring 45c.

Referring, to FIGS. 18 and 19, coupling device 44 includes a cylinder 47, receiving the hydraulic supply from hydraulic means 25, one side of which is connected to the rear of chassis II, the other end of which is connected to supporting pin 45a. Working machine attachment 60 at the rear of coupling device 44 is easily installed. Using cylinder 47, the operator on the driver seat 12 of said combined control machine car body 10 can raise and lower working machine attachment 60 and when trenching work and the work for spreading earth is performed, the working depth of the ground can be easily controlled by the operator on the combined control machines car body 10. Therefore, a high degree of efficiency can he attained by one operator.

Referring to FIGS. 20 and 21, another embodiment of working machine attachment 60 includes a plow 55 for moving land. A Coupling rod 56 inserts through a coupling hole 55a of plow 55 and hole 44e (shown in FIG. 19) of supports 44a. Therefore the operator can perform the arrangement of plow 55 easily.

Referring now to FIG. 22, working machine attachment 60, installed at the installation means 40, includes a trencher 68 which receives power through PTO gear box 30 to perform trench work. In this manner, the trench work of the orchard is easily performed.

Referring now also to FIG. 23, trencher 68, at installation means 40, includes a sub-chain box 68b which receives power from the rear of a chain box 68a also included in trencher 68. An ordinary screw type machine for spreading earth connected at the lower part of trencher 68 can be driven by sub-chain box 68b. In this way, trench work and spreading of earth can be simultaneously performed, and the efficiency of fruit culture work is thereby increased.

Referring now to FIG. 24, working machine attachment 60 includes a compost sprinkler 70 which receives power from PTO gear box 30 and is installed with said means for ascending, descending and lifting 50. Accordingly, said work for sprinkling compost is easily performed. Referring now also to FIGS. 25 and 26, compost sprinkler 70 includes guide boards 72 and 72'. A control rod 72a and a guide rod 73, which fixably inserts inside control rod 72a, are fixedly connected to guide boards 72 and 72', respectively. Guide boards 72 and 72' are simultaneously moved from side to side to control the scattering angle of compost. A fixed screw 73a at control rod 72a makes guide rod 73 of guide board 72' inserted to the control rod 72a fixed or moveable to control the sprinkling direction of compost, and accordingly, the work for sprinkling compost can be effectively performed.

Referring now also to FIG. 27, the compost sprinkler 70, optionally includes a cover 74 for preventing scatter at the rear of outlet 71 of compost sprinkler 70. Therefore, sprinkling compost directly under compost sprinkler 70 is facilitated.

Referring now to FIG. 28, compost sprinkler 70 includes a screw conveyor 75 on the inside and evenly transmits compost 75b to the side part and distributes compost 75b through an exhaust hole 75a at the lower side of screw conveyor 75. Compost 75b transmitted by said screw conveyor 75 discharges to the lower part of compost sprinkler 70 at one side of compost sprinkler 70.

Referring now to FIGS. 29 and 30, compost sprinkler 70 optionally includes screw conveyor 75 having a driving sprocket 76 which receives power transmission from PTO gear box 30, inside compost sprinkler 70. Accordingly, compost, fertilizer, or lime is transferred to one side of compost sprinkler 70 via screw conveyor 75. Additionally, compost sprinkler 70 includes guide boards 77 and 77', each having a plurality of holes 77a and 77a', connected at the upper both sides of and parallel to screw conveyor 75. Guide boards 77 and 77' include sprockets 77b and 77b' which receive power transmission through a chain 79 connected to driving sprocket 76 of screw conveyor 75, rotating guide boards 77 and 77' toward screw conveyor 75. The rotation of guide boards 77 and 77' ensures that the compost, fertilizer, or lime is constantly supplied to screw conveyor 75.

Referring now also to FIG. 31, an exhaust barrel 78 is set up at the outside of compost sprinkler 70 at one end of screw conveyor 75. Exhaust barrel 78 allows another fertilizer or compost to be simultaneously discharged with the compost or fertilizer discharged by screw conveyor 75. Exhaust barrel 78 includes a hopper 78a with a control board 78a' at the upper side for controlling the rate at which another fertilizer or compost is discharged through another exhaust hole 78b, formed at the lower portion of exhaust barrel 78. A cut-off board 78c, installed at the outside of the front and rear of another exhaust hole 78b ensures that the compost is discharged directly underneath the exhaust barrel 78. An extension of screw conveyor 75, inside exhaust barrel 78, discharges compost from exhaust barrel 78.

Referring now again to FIGS. 29 and 30, an idle sprocket 79', connected by chain 79 is installed at one side of sprockets 77b and 77b', is used to turn guide boards 77 and 77' in opposite directions to screw conveyor 75. The compost or fertilizer of compost sprinkler 70 is thereby transfer toward screw conveyor 75 side at all times. Accordingly, the compost inside compost sprinkler 70 is easily discharged, and at the same time the work for sprinkling compost can be more easily performed.

Referring now to FIG. 32, working machine 60 includes a machine for spreading earth 80 which receives power from PTO gear box 30 to perform the work for spreading earth. Therefore, the work for spreading earth can be easily performed by combined control machine car 10.

Referring now also to FIG. 33, trencher 68 installed with machine for spreading earth 80', performing the work for spreading earth at the rear, receives power transmission from PTO gear box 30 thereby performing trenching work and the work for spreading earth simultaneously.

Referring now to FIG. 34, a machine for crushing twigs 81 receives the power transmission from PTO gear box 30 to crush twigs.

Referring now to FIG. 35, a weeder 82 receives power transmission from PTO gear box 30 thereby performing weeding work.

Referring now to FIG. 36, a cultivation rotary 83 receives power transmission from PTO gear box 30 thereby performing rotary work.

Referring now to FIGS. 37 and 38, a machine for preventing damage by disease and pest 84 installed on said means for ascending, descending and lifting 50 to prevent damage by disease and pest. FIG. 38 specifically shows machine for preventing damage by disease and pest 84 installed on an ordinary stand 90. Accordingly, the preventive work for damage by disease and pest can be effectively performed.

Referring now to FIGS. 39 and 40, a loading box 85 is mounted on means for ascending, descending, and lifting 50 for use in multipurpose tasks requiring additional height. FIG. 40 shows loading box 85 mounted on an ordinary stand 90 and easily installed with said means for ascending, descending and lifting 50 so the loading work for multipurpose tasks is easily performed.

The present invention is a combined control machine car body equipped with an engine and transmission having a hydraulic pump providing hydraulic pressure to the means for ascending, descending and lifting. An air compressor provides the required air pressure to the air tank. A plurality of power shafts with PTO gear box provide the power to the various working machines install and also makes the various kinds of working machines simple and easy to install. The present invention allows many working machines to be set up simultaneously and allows the various kinds of tasks to be performed without another power Source. Also, alterations to the working machines are performed automatically, so various works of the orchard can be simultaneously performed and the fruit culture tasks of preventive work for damage by disease and pest, the rotary work, the cultivation weeding work, the work for spreading earth, the transport work, the pruning work, the work for sprinkling compost (compost, organic fertilizer and lime), the weeding work, the trenching work, the work for crushing twigs, and the work for cutting and sprinkling rice-straw, can all be efficiently performed. At the same time, the curtailment of expenditure and the income enlargement of the fruit culture farm household can be raised.

What is claimed is:

1. A combined control machine for an orchard comprising:

a chassis;

a driving device including an engine mounted on said chassis;

a transmission mounted on said chassis;

a gear box mounted at a rear of said chassis;

said transmission including means for moving said combined control machine;

a least one installation means for coupling a working machine attachment to said combined control machine;

means for raising and lowering a platform mounted in a center of said chassis;

hydraulic means for providing hydraulic power to said working machine attachment coupled to said combined control machine and said means for raising and lowering;

said engine being drivingly connected to said transmission, said gear box, said means for raising and lowering, said hydraulic means, and said working machine attachment coupled to said combined control machine;

said gear box being drivingly connected to said working machine attachment coupled to said rear of said combined control machine.

2. The combined control machine for an orchard of claim 1, wherein:

said driving device further includes a front power shaft; and said front power shaft being drivingly connected to said transmission and said gear box.

3. The combined control machine for an orchard of claim 1, further comprising means for separately changing a speed of said combined control machine and a speed of said gear box.

4. The combined control machine for an orchard of claim 1, wherein:
   said hydraulic means includes a hydraulic pump driven by said engine; and
   said hydraulic pump hydraulically connected to various hydraulic cylinders located at said means for raising and lowering and said working machine attachment coupled to said combined control machine.

5. The combined control machine for an orchard of claim 1, wherein said hydraulic means includes:
   an air compressor;
   said engine drivingly connected to said air compressor;
   an air tank; and
   said air compressor including means for pressurizing said air tank.

6. The combined control machine for an orchard of claim 1, wherein said at least one installation means includes;
   an installing rod fixedly connected across one of said front end and said rear end of said chassis;
   a pair of fixed pins on opposing sides of said chassis, between said installing rod and a center of said chassis;
   a coupling device;
   means for supporting said coupling device on said installing rod;
   said pair of fixed pins including means for holding said coupling device in place on said installing rod; and
   said coupling device having means for coupling said working machine attachment.

7. The combined control machine for an orchard of claim 6, wherein said coupling device includes:
   a pair of supporting boards arranged substantially parallel to each other;
   each of said supporting boards having inserting grooves on upper and lower sections of said supporting boards corresponding to said pair of fixed pins and said installing rod;
   a longitudinal supporter fixedly connecting said pair of supporting boards;
   a fixed coupling rod pivotally connected to said longitudinal supporter; and
   a loading stand pivotally connected at a rear lower part of said coupling device;
   means for supporting boards and said loading stand, connected between a first of said supporting boards and said loading stand;
   said means for supporting including means for receiving hydraulic pressure from said hydraulic pump.

8. The combined control machine for an orchard of claim 7, wherein said loading stand further includes:
   an installing groove on an upper portion of said loading stand; and
   a rear portion of said loading stand a hole.

9. The combined control machine for an orchard of claim 8, further including:
   a connecting device having a connecting board;
   said connecting device including means for being held by said installing groove and said fixed hole at said rear of said coupling device;
   said connecting board including means for mounting a small-sized working machine attachment to said combined control machine.

10. The combined control machine for an orchard of claim 6, wherein said coupling device includes:
    a pair of support boards each having an installing rod insertion pipe at an upper side of said support boards;
    said installing rod insertion pipes including means for receiving said installing rod such that said coupling device pivots about said installing rod;
    means for elastically supporting said coupling device.

11. The combined control machine for an orchard of claim 10, wherein said gear box includes a power transmission shaft having first and second universal joints connected in series thereby allowing an adjustment of a mounting position of said gear box.

12. The combined control machine for an orchard of claim 10, wherein said means for elastically supporting said coupling device includes:
    each of said support boards including an arc shaped supporting pin inserting hole;
    a spring having a supporting pin at one end;
    a fixed board fixedly connected to said each of said support boards;
    said supporting pin inserted in said supporting pin inserting hole; and
    another end of said spring fixedly mounted on said fixed board.

13. The combined control machine for an orchard of claim 12, further including:
    a hydraulic cylinder;
    said supporting pin connected through said supporting pin inserting hole to one end of a hydraulic cylinder; and
    another end of said hydraulic cylinder fixedly connected to said chassis.

14. The combined control machine for an orchard of claim 10, further including:
    a plow effective for moving earth;
    said coupling device receives a coupling rod of said plow through a hole formed at a rear side of said pair of supports; and
    said coupling rod effective to hold said plow in place.

15. The combined control machine for an orchard of claim 10, wherein said working machine attachment includes:
    a plow effective for plowing land;
    said plow being fixedly connected to said working machine coupling board.

16. A combined control machine for an orchard according to claim 10, wherein said working machine attachment includes:
    a trencher; and
    means for providing power to said trencher via said gear box.

17. The combined control machine for an orchard of claim 16, wherein said trencher includes:
    a first chain-driven gear box effective for driving a machine for spreading earth;
    a second chain-driven gear box effective for driving a trencher;
    means for transferring power from said gear box to said first chain-driven gear box;
    means for transferring said power from said first chain-driven gear box to said second chain-driven gear box whereby said trencher and said machine for spreading earth operate simultaneously.

18. The combined control machine for an orchard of claim 10, wherein said working machine attachment includes:

a compost sprinkler; and means for transferring power from said gear box to said compost sprinkler.

19. The combined control machine for an orchard of claim 18, wherein said compost sprinkler includes:

an outlet;

a pair of guide boards at the inside of said outlet;

a guide rod;

a control rod slidably connected to said guide rod;

said guide rod and control rod connecting said pair of guide boards;

means for pivoting said pair of guide boards;

a fixed screw inserted in said control rod effective to fix said guide rod inserted in said control rod effective for controlling a sprinkling direction of compost.

20. The combined control machine for an orchard of claim 19, wherein said compost sprinkler further includes a cover connected over said outlet effective for directing said compost directly under said compost sprinkler.

21. The combined control machine for an orchard of claim 19, wherein said compost sprinkler further includes:

a screw conveyor rotatably mounted in said compost sprinkler effective to transfer compost toward an exhaust hole located along a bottom of said compost sprinkler at one end of said screw conveyor;

a driving sprocket connected at one end of said screw conveyor;

means for transferring power from said gear box to said driving sprocket.

22. The combined control machine for an orchard of claim 21, wherein said compost sprinkler further includes:

a pair of guide boards rotatably mounted on either side of said screw conveyor parallel to said screw conveyor in said compost sprinkler;

said pair of guide boards having holes throughout their length;

means for rotating said guide boards as said screw conveyor rotates;

a separate hopper mounted at a side of said compost sprinkler having a separate exhaust hole;

means for applying a mixture, separate from said compost in said compost sprinkler, to said ground, through said separate exhaust hole.

23. The combined control machine for an orchard of claim 10, wherein said working machine includes a means for spreading earth, and means for powering said means for spreading with said gear box.

24. The combined control machine for an orchard claim 23, wherein said working machine attachment further includes a means for trenching and means for driving said means for trenching with said gear box.

25. The combined control machine for an orchard of claim 10, wherein said working machine attachment includes means for crushing twigs, and said means for crushing twigs is driven by said gear box.

26. The combined control machine for an orchard of claim 10, wherein said working machine attachment includes means for weeding, and said means for weeding is driven by said gear box.

27. The combined control machine for an orchard of claim 10, wherein said working machine attachment is a cultivation rotary, said cultivation rotary is driven by said gear box.

28. The combined control machine for an orchard of claim 10, wherein:

said working machine attachment is mounted on said means for ascending, descending, and lifting;

said working machine attachment includes a means for preventing damage by disease and pest, and said means for preventing damage is drivingly connected to said gear box.

29. The combined control machine for an orchard of claims 10, wherein said working machine attachment is mounted on said means for ascending, descending, and lifting and includes a loading box.

30. The combined control machine for an orchard of claim 1, wherein said means for raising and lowering further includes:

two pairs of longitudinal lifting boards;

each one of said two pairs being rotatably connected at a center of each of said lifting boards;

a supporting shaft connecting said centers of each of said two pairs of longitudinal lifting boards;

inserting grooves in said chassis corresponding to a bottom of each of said lifting boards;

a lifting insert pin fixedly mounted on said bottom of each of said lifting boards;

each of said insert pins corresponding to one of said inserting grooves;

a projecting pin mounted on an inside upper portion of said each of said lifting boards;

said projecting pins collectively effective to support one of a loading box and a working stand; and a hydraulic cylinder mounted between said supporting shaft and said chassis; and said cylinder including means for raising and lowering said supporting shaft.

31. The combined control machine for an orchard of claim 1, wherein said working machine attachment coupled to said combined control machine further includes a hydraulic motor receiving hydraulic pressure from said hydraulic means such that said working machine attachment is powered by said hydraulic means.

32. The combined control machine for an orchard of claim 1, wherein said working machine attachment further includes:

a hydraulic cylinder effective to receive hydraulic pressure from said hydraulic means;

means for controlling a vertical position of said working machine attachment;

said means for controlling a vertical position including a hydraulic control valve;

a lever pivotally connected to said working machine;

means for pivoting said lever responsive to a ground level beneath said working machine attachment; and said means for controlling a vertical position responsive to said means for pivoting.

33. A combined control machine for an orchard, comprising:

a chassis having a front end and a rear end;

an engine mounted on said chassis;

said engine drivingly connected to a transmission, for propelling said combined control machine, and a power take-out (PTO) gear box;

means for mounting at least one of a plurality of machine attachments on said combined control machine, said plurality of machine attachments performing various tasks required for an orchard;

said at least one of a plurality of machine attachments being drivingly connectable to said PTO gear box;

a hydraulic system being driven by said engine;

said hydraulic system being hydraulically connectable to said at least one of a plurality of machine attachments mounted on said combined control machine; a power shaft connected at one end to said engine; another end of said power shaft transmitting power to said PTO gear box; a front power shaft including means for providing power to said at least one of said plurality of machine attachments mounted at said front of said chassis; and said engine drivingly connected to said front power shaft.

34. The combined control machine for an orchard of claim 33, further including:

connecting means at said front and said rear end of said combined control machine; and each of said plurality of machine attachments being mountable on said connecting means.

* * * * *